(12) United States Patent
Zhang

(10) Patent No.: US 11,579,960 B2
(45) Date of Patent: Feb. 14, 2023

(54) CHIP FAULT DIAGNOSIS METHOD, CHIP FAULT DIAGNOSIS DEVICE, COMPUTER-READABLE STORAGE MEDIUM AND ELECTRONIC EQUIPMENT

(71) Applicant: Horizon (Shanghai) Artificial Intelligence Technology Co., Ltd., Shanghai (CN)

(72) Inventor: Bin Zhang, Shanghai (CN)

(73) Assignee: Horizon (Shanghai) Artificial Intelligence Technology Co., Ltd., Shanghai (CN)

( * ) Notice: Subject to any disclaimer, the term of this patent is extended or adjusted under 35 U.S.C. 154(b) by 0 days.

(21) Appl. No.: 17/507,158

(22) Filed: Oct. 21, 2021

(65) Prior Publication Data

US 2022/0129338 A1 Apr. 28, 2022

(30) Foreign Application Priority Data

Oct. 22, 2020 (CN) .......................... 202011143874.4

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0751* (2013.01); *G06F 11/0772* (2013.01)

(58) Field of Classification Search
None
See application file for complete search history.

(56) References Cited

U.S. PATENT DOCUMENTS

| 5,812,439 A * | 9/1998 | Hansen ............... G06F 9/30189 |
| | | 712/E9.035 |
| 2016/0321131 A1* | 11/2016 | Miyamoto .......... G06F 11/0778 |
| 2019/0163655 A1* | 5/2019 | Yamaguchi ............. G06F 13/24 |
| 2020/0159635 A1* | 5/2020 | Song ...................... G11C 29/52 |

OTHER PUBLICATIONS

Google Scholar/Patents search—text refined (Year: 2022).*

* cited by examiner

*Primary Examiner* — Christopher S McCarthy
(74) *Attorney, Agent, or Firm* — Bret E. Field; Bozicevic, Field & Francis LLP

(57) ABSTRACT

The present disclosure provides a chip fault diagnosis method, which includes: determining an interrupt flag of an interrupt flag register based on first data identifying an interrupt state in the interrupt flag register; and determining a fault state of chip interrupt corresponding to the interrupt flag based on the interrupt flag. By adopting the technical solution provided by the present disclosure, a fault of the interrupt can be diagnosed in time, and the interrupt can be processed in time.

14 Claims, 11 Drawing Sheets

CHIP FAULT DIAGNOSIS METHOD, CHIP FAULT DIAGNOSIS DEVICE, COMPUTER-READABLE STORAGE MEDIUM AND ELECTRONIC EQUIPMENT

RELATED APPLICATION INFORMATION

This application claims priority to Chinese patent application Serial No. 202011143874.4 filed on Oct. 22, 2020, incorporated herein by reference.

TECHNICAL FIELD

The present disclosure relates to the technical field of chips, in particular to a chip fault diagnosis method, a chip fault diagnosis device, a computer-readable storage medium and electronic equipment.

BACKGROUND

One of basic functions of an SOC is that a hardware functional module in an SOC chip sends out an interrupt request to interrupt software in a CPU. When a predefined interrupt event occurs, the hardware functional module sends the interrupt request to an interrupt controller, and the interrupt controller will generate an interrupt signal to the designated CPU to interrupt a routine program of the CPU, so that an interrupt event processing program can be executed preferentially.

An Interrupt event occurs in the hardware functional module of a common SOC, and then the hardware functional module transmits the interrupt signal to the interrupt controller through an SOC on-chip bus or an interrupt signal line. After receiving the interrupt signal, the interrupt controller sends the interrupt signal to the designated CPU according to the configuration of the interrupt signal. After receiving the interrupt signal, the CPU tries to interrupt a running common program, and then calls a corresponding chip interrupt processing program.

However, in the prior art, interrupt processing is usually started by an interrupt signal. That is, the interrupt processing is started when the interrupt signal is received, but not started when the interrupt signal is not received. As for this processing way, when the hardware functional module, the interrupt controller or a communication link fails, it is difficult to receive the signal or a wrong signal will be received, and the program is executed according to the failure to receive the signal or the wrong signal. Hence, it is hard to discover the fault.

SUMMARY

In order to solve the above technical problems, the present disclosure is proposed. Embodiments of the present disclosure provide a chip fault diagnosis method, a chip fault diagnosis device, a computer-readable storage medium and electronic equipment, which can determine a fault state of a chip in time, and are beneficial for timely troubleshooting.

According to an aspect of the present disclosure, there is provided a chip fault diagnosis method, including:

determining an interrupt flag of an interrupt flag register based on first data identifying an interrupt state in the interrupt flag register; and determining a fault state of a chip interrupt corresponding to the interrupt flag based on the interrupt flag.

According to a second aspect of the present disclosure, there is provided a chip fault diagnosis device, including:

an interrupt flag determining module, which is configured to determine an interrupt flag of an interrupt flag register based on first data identifying an interrupt state in the interrupt flag register; and a fault state determining module, which is configured to determine a fault state of a chip interrupt corresponding to the interrupt flag based on the interrupt flag.

According to a third aspect of the present disclosure, there is provided a computer-readable storage medium, wherein the storage medium stores a computer program which is used for executing any of the chip fault diagnosis methods described above.

According to a fourth aspect of the present disclosure, there is provided electronic equipment, including:

a processor; and a memory for storing a processor-executable instruction, wherein the processor is used for reading the executable instruction from the memory and executing the instruction to implement any of the chip fault diagnosis methods.

According to the above technical solutions provided by the present disclosure, the interrupt flag is determined by the first data in the interrupt flag register, and since the interrupt flag can identify whether the interrupt occurs, the state of the corresponding chip interrupt fault can be determined according to the interrupt flag. In the technical solution of the present disclosure, because the interrupt flag in the interrupt flag register identifies the state type of the chip interrupt, no matter whether an interrupt signal is received or not, verification can be carried out through the interrupt state represented by the interrupt flag, so that the fault state of the chip can be determined in time, which is beneficial for timely troubleshooting and timely processing of the interrupt.

BRIEF DESCRIPTION OF DRAWINGS

The above and other objects, features and advantages of the present disclosure become more apparent by describing embodiments of the present disclosure in more detail in conjunction with the accompanying drawings. The accompanying drawings are used to provide a further understanding of the embodiments of the present disclosure, constituting a part of the specification, and together with the embodiments of the present disclosure, are used to explain the present disclosure, but do not constitute a limitation on the present disclosure. In the accompanying drawings, the same reference numerals generally represent same components or steps.

DETAILED DESCRIPTION OF THE EMBODIMENTS

Exemplary embodiments of the present disclosure will be described below in detail with reference to the accompanying drawings. It is apparent that the described embodiments are only a part of the embodiments of the present disclosure, but not all the embodiments of the present disclosure. It should be understood that the present disclosure is not limited by the exemplary embodiments described here.

Application Overview

In a common SOC, interrupt events occur in hardware functional modules, such as a network module, an input-output module, a storage module or an image acquisition module. For example, the network module may be an Ethernet module, and the image acquisition module may be a camera and the like. And then the hardware functional module transmits an interrupt signal to an interrupt controller through an SOC on-chip bus or an interrupt signal line. After receiving the interrupt signal, the interrupt controller sends the interrupt signal to a designated CPU according to the configuration of the interrupt signal. After receiving the interrupt signal, the CPU tries to interrupt a running common program, and then calls a corresponding interrupt processing program. In this interrupt processing procedure, only the interrupt signal is used to judge occurrence of the interrupt. When the hardware functional module, the interrupt controller or a communication link fails, it will always be difficult to receive the interrupt signal or a wrong signal is received, and the program will be executed according to failure to receive the interrupt signal or the received wrong signal. Hence, it is hard to find the fault in time.

Aiming at above problems, the present disclosure provides a chip fault diagnosis method, including:

determining an interrupt flag of an interrupt flag register based on first data identifying an interrupt state in the interrupt flag register; and determining a fault state of a chip interrupt corresponding to the interrupt flag based on the interrupt flag.

In the technical solution provided by the present disclosure, the interrupt flag is determined by the first data in the interrupt flag register, and since the interrupt flag can identify whether the interrupt occurs, the state of the corresponding chip interrupt fault can be determined according to the interrupt flag. In the technical solution of the present disclosure, because the interrupt flag in the interrupt flag register identifies the state type of the chip interrupt, no matter whether an interrupt signal is received or not, verification can be carried out through the interrupt state represented by the interrupt flag, so that the fault state of the chip can be determined in time, which is beneficial for timely troubleshooting and timely processing of the interrupt.

Exemplary System

Figure 1:
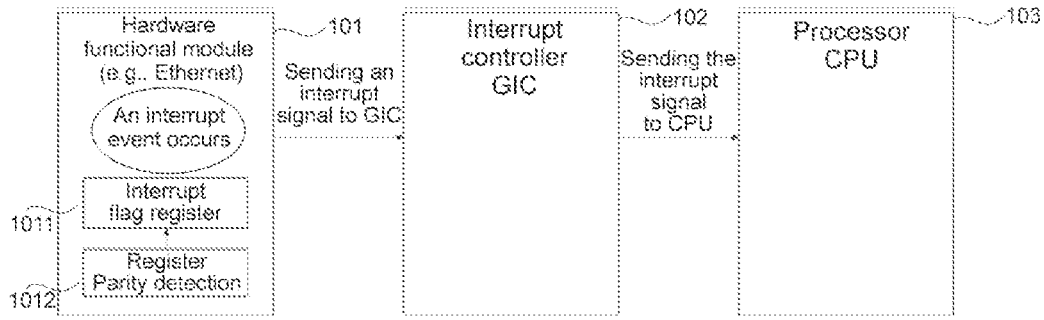
FIG. 1 is a structural diagram of an interrupt processing system to which the present disclosure is applicable.

FIG. 1 is a structural diagram of an interrupt processing system to which the present disclosure is applicable. As shown in FIG. 1, a hardware functional module 101 of a SOC may be, for example, a network module, an input/output module, a storage module or an image acquisition module, in which an interrupt event can occur. Then, the hardware functional module 101 transmits an interrupt signal to an interrupt controller 102 through an SOC on-chip bus or an interrupt signal line, and the hardware functional module 101 sets a corresponding interrupt flag in an internal interrupt flag register 1011 thereof to indicate occurrence of the interrupt event. After receiving the interrupt signal, the interrupt controller sends the interrupt signal to a designated CPU 103 according to the configuration of the interrupt signal. After receiving the interrupt signal, the CPU 103 tries to interrupt a running common program, and then calls a corresponding chip interrupt processing program. In general, the interrupt flag register 1011 of the hardware functional module 101 may make an error, which may cause the interrupt flag to be set unexpectedly, but the situation can be avoided by a parity query detection module 1012 of the interrupt flag register of the hardware functional module 101. Therefore, when there is a corresponding flag in the interrupt flag register of the hardware functional module 101, the flag is considered to be reliable.

Exemplary Method

Figure 2:
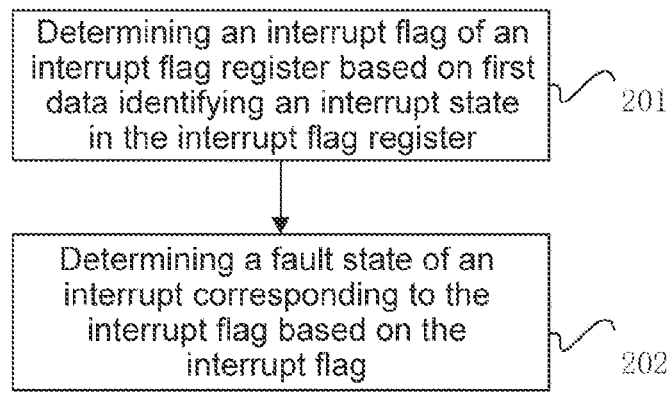
FIG. 2 is a schematic flow chart of a chip fault diagnosis method provided by an exemplary embodiment of the present disclosure.

FIG. 2 is a chip fault diagnosis method provided by an exemplary embodiment of the present disclosure. The present embodiment can be applied to electronic equipment, and as shown in FIG. 2, it includes the following steps:

Step 201, determining an interrupt flag of an interrupt flag register based on first data identifying an interrupt state in the interrupt flag register;

In some embodiments, the interrupt flag register 1011 is the interrupt flag register 1011 in the hardware functional module 101, and the hardware functional module 101 may be a network module, an input/output module, a storage module or an image acquisition module. For example, the network module may be an Ethernet module, and the image acquisition module may be a camera. The first data refers to data which is set in a preset field in the interrupt flag register 1011, and the first data changes based on the interrupt. For example, a preset bit of the preset field in the interrupt flag register 1011 is 1 when the interrupt occurs and is 0 when the interrupt does not occur. Hence, if it is detected that the preset bit in the preset field becomes 1, it indicates that the interrupt occurs. The interrupt flag is a flag corresponding to the first data, and the interrupt flag indicates whether an interrupt has occurred at present. For example, when the preset bit in the first data is 1, it indicates that the current interrupt flag has been set, that is, an interrupt has occurred; and when the preset bit in the first data is 0, it indicates that the current interrupt flag is not set, that is, no interrupt has occurred. When an interrupt occurs, the preset bit in the first data becomes 1, that is, the hardware functional module 101 sets the interrupt flag, and meanwhile, the hardware functional module 101 transmits information of the interrupt occurrence to the interrupt controller 102 via the SOC on-chip bus or the interrupt signal line. After receiving the information of the interrupt occurrence, the interrupt controller 102 sends the interrupt signal to the designated CPU 103.

Step 202, determining a fault state of a chip interrupt corresponding to the interrupt flag based on the interrupt flag.

In some embodiments, the interrupt flag identifies a current interrupt state. Under a normal state, the hardware functional module 101 will send an interrupt signal to the CPU 103 through the interrupt controller 102 while setting the interrupt flag. Regardless of whether the CPU 103 receives the interrupt signal sent by the interrupt controller 102 or not, the CPU 103 can determine the interrupt flag according to the first data in the interrupt flag register 1011, and judge the fault state of the chip interrupt according to the interrupt flag. For example, when the CPU 103 receives the interrupt signal sent by the interrupt controller 102, the preset bit of the first data is 0, that is, the interrupt flag is in an unset state. At this time, the unset state of the interrupt flag indicates that no interrupt has occurred at present, while receiving the interrupt signal indicates that an interrupt has occurred at present, which indicates that the interrupt has failed. For another example, when the CPU 103 does not receive the interrupt signal sent by the interrupt controller 102, the preset bit of the interrupt flag register 1011 is 1, that is, the interrupt flag is set. At this time, the interrupt flag indicates that an interrupt has occurred at present, while failure to receive the interrupt signal indicates that the interrupt has not occurred at present, which also indicates that the interrupt has failed.

In the chip fault diagnosis method provided in the present disclosure, since the interrupt flag in the interrupt flag register 1011 is used to identify the interrupt state of the chip, whether an interrupt signal is received or not, verification can be performed through the interrupt state represented by the interrupt flag, so that the fault state of the chip can be determined in time, which is beneficial for timely troubleshooting and processing of the interrupt.

Figure 3:
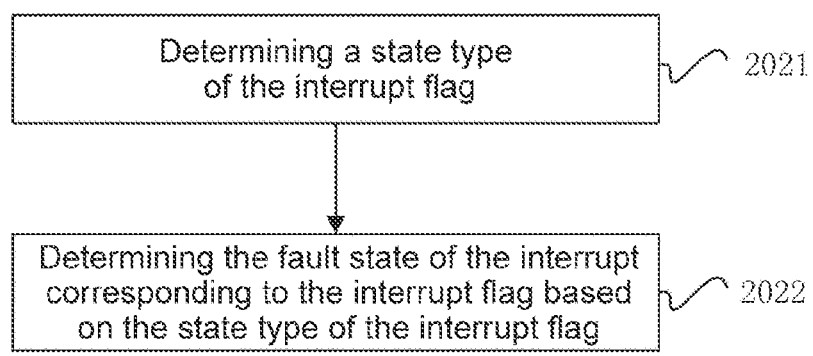
FIG. 3 is a schematic flow chart of determining an interrupt fault state in a chip fault diagnosis method provided by another exemplary embodiment of the present disclosure.

As shown in FIG. 3, based on the implementation shown in FIG. 2, step 202 may include the following steps:

Step 2021, determining a state type of the interrupt flag;

In some embodiments, the state types of the interrupt flag include a first state type identifying an interrupt occurrence state and a second state type identifying an interrupt enabling state. In some preferred embodiments, the priority of the state type of the interrupt flag can be determined among the above two types of states. For example, since the first state type directly identifies whether the interrupt occurs or not, while the second state type has a control effect on the first state type, that is, the second state type indirectly controls sending of an interrupt signal, the priority of the first state type is set to be higher and the priority of the second state type is set to be lower. In this way, the fault of a chip interrupt can be directly confirmed by the first state type which directly characterizes whether the interrupt occurs or not. When the fault of the chip interrupt cannot be confirmed by the first state type, it can be further confirmed by the second state type, thus guaranteeing both efficiency and accuracy. In general, the state type of the interrupt flag is formed by the combination of the first state type and the second state type of the interrupt. However, when the state type of the chip interrupt can be determined by only one of the states, one of them can be used for judgment. Specifically, the first state type indicates whether the chip interrupt has occurred at present, while the second state type indicates whether the current chip interrupt is shielded. For example, when the second state type is an enabled state, it indicates that the interrupt signal can be sent to the CPU 103 when the first state type can be expressed as a set state, and when the second state type is a non-enabled state, it indicates that the interrupt signal cannot be sent to the CPU 103 when the first state type cannot be expressed as the set state.

Step 2022, determining the fault state of the chip interrupt corresponding to the interrupt flag based on the state type of the interrupt flag.

In some embodiments, the state type of the interrupt flag is obtained by a combination of the first state type and the second state type, and the fault state of the chip interrupt corresponding to the interrupt flag can be obtained by verifying this state type and the current situation that the CPU 103 receives or does not receive the interrupt signal. For example, the first state type is a set state and the second state type is an enabled state. At this time, the first state type indicates that the chip interrupt has occurred at present, but the CPU 103 has not received the interrupt signal at present. At this time, the state of not receiving the interrupt signal indicates that the chip interrupt has not occurred at present. Through this contradictory situation, it can be judged that the fault state of the chip interrupt is a failed state. In some embodiments, the first state type is used for judgment when whether the interrupt fails can be judged by only using the set or unset state type of the first state type. For example, at present, the CPU 103 has received the interrupt signal, then the state of receiving the interrupt signal indicates that the chip interrupt has occurred at present; but the first state type is an unset state, then the first state type indicates that the chip interrupt has not occurred at present. Thus it can be judged through this state that the interrupt has failed, and it is not necessary to query the second state type.

In the above embodiment, the state type of the interrupt flag is used to verify whether the current situation that the CPU 103 receives or does not receive the interrupt signal is correct, so as to judge whether the interrupt fails. No matter whether the interrupt signal is received or not at present, the interrupt fault can be diagnosed.

Figure 4:
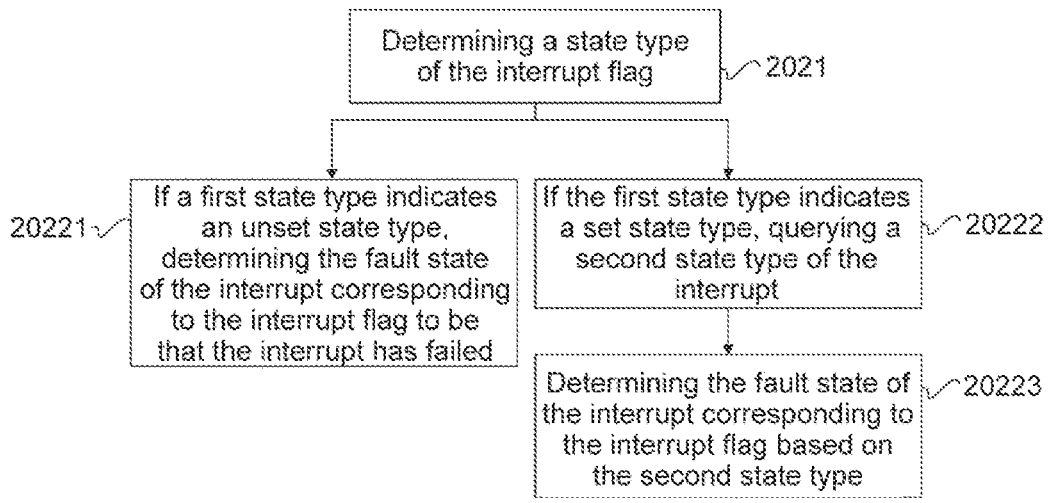
FIG. 4 is a schematic flow chart of determining an interrupt fault state in a chip fault diagnosis method provided by still another exemplary embodiment of the present disclosure.

As shown in FIG. 4, based on the embodiment shown in FIG. 3, the state types of the interrupt flag include the first state type indicating the interrupt occurrence state and the second state type indicating the interrupt enabling state.

In some embodiments, the interrupt flag register 1011 may be, for example, a register, and the interrupt flag register 1011 includes at least two preset fields, data stored in one of which is used to represent the first state type of the interrupt flag, and data stored in the other of which is used to represent the second state type of the interrupt flag. The state types of the interrupt flag include the first state type and the second state type. For example, the interrupt flag register 1011 may also be a combination of two registers, wherein data stored in a preset field of one register is used to represent the first state type of the interrupt flag, and data stored in a preset field of the other register is used to represent the second state type of the interrupt flag. The first state type is used to indicate the interrupt state of the chip. When the first state type is a set state type, it indicates that the interrupt has occurred at present; and when the first state type is an unset state, it indicates that the interrupt has not occurred at present. The state type of an enabling flag is used to indicate whether the first state type is allowed to change. When the second state type is an enabled state type, it indicates that the first state type is allowed to change at present, that is, the first state type is allowed to change to the set state when the interrupt occurs. When the second state type is a non-enabled state, it indicates that the first state type is not allowed to change at present, and even if the interrupt occurs, the first state type is still the unset state.

Step 2022 includes:

Step 20221, if the first state type indicates an unset state type, determining the fault state of the chip interrupt corresponding to the interrupt flag to be that the interrupt has failed;

In some embodiments, the set or unset state type of the first state type directly influences sending of the interrupt signal. When the set or unset state of the first state type is inconsistent with the state of the interrupt signal, it can be directly judged that the chip interrupt fails. For example, in a judgment process after the CPU 103 receives the interrupt signal, when the CPU 103 receives the interrupt signal, the interrupt fault is judged according to the first state type. At this time, the first state type is first determined. When the first state type is displayed to be an unset state, the first state type indicates that no interrupt has occurred at present, while the interrupt signal indicates that the interrupt has occurred at present. The contradiction between both determines that the fault state of the current interrupt is a fault that has occurred.

Step 20222, if the first state type indicates a set state type, querying the second state type;

In some embodiments, the second state type determines whether the first state type can be expressed as the set state type when the chip interrupt occurs, so the second state type also has a certain characterization effect on the fault state of the chip interrupt. For example, in a judgement process after the CPU 103 receives the interrupt signal, when the CPU 103 receives the interrupt signal, it judges the interrupt fault according to the first state type. At this time, the first state type of the interrupt flag is first determined. When the first state type is the set state, the first state type indicates that the interrupt has occurred at present, and the interrupt signal also indicates that the fault has occurred at present. Both of them are consistent. However, whether the CPU 103 can receive the interrupt signal or not is still influenced by the second state type, so that the second state type should be further verified.

Step 20223, determining the fault state of the chip interrupt corresponding to the interrupt flag based on the second state type.

In some embodiments, the second state type can influence whether the first state type can be expressed as the set state, thus influencing sending of the interrupt signal. Therefore, based on the second state type, the fault state of a chip interrupt can be further confirmed. For example, in a judgment process after the CPU 103 receives the interrupt signal, when the second state type is the non-enabled state, it indicates that the interrupt flag cannot be expressed as the set state, so that the interrupt signal cannot be sent out, which indicates that the CPU 103 should not receive the interrupt signal at present. At this time, if the CPU 103 receives the interrupt signal, it is contradictory to the second state type, and this contradictory situation indicates that the current interrupt fails.

In the above embodiment, the signal received by the CPU 103 is further verified by the second state type, so that the fault state of the interrupt can be judged more accurately.

Figure 5:
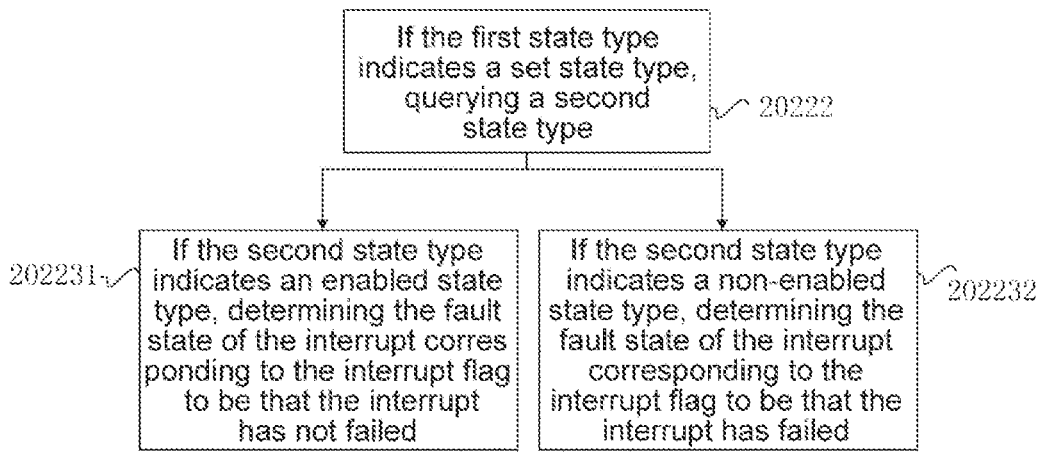
FIG. 5 is a schematic flow chart of determining an interrupt fault state in a chip fault diagnosis method provided by still another exemplary embodiment of the present disclosure.

As shown in FIG. 5, in the above embodiment shown in FIG. 4, step 20223 includes the following steps:

Step 202231, if the second state type indicates an enabled state type, determining the fault state of the chip interrupt corresponding to the interrupt flag to be that the interrupt has not failed;

In some embodiments, when the second state type indicates the enabled state type, the first data indicating the interrupt flag will change with the occurrence and processing of the interrupt, that is, when the interrupt occurs, the first state type indicates the set state and sends the interrupt signal at the same time. In a judgement process after the CPU 103 receives the interrupt signal as well, when the CPU 103 receives the interrupt signal and the first state type is the set state, it is necessary to judge the fault state according to the second state type. When the second state type is the enabled state, it indicates that the first state type can be expressed as the set state, that is, the CPU 103 can receive the interrupt signal. This situation is consistent with the situation that the CPU 103 has received the interrupt signal, which indicates that the interrupt has not failed.

Step 202232, if the second state type indicates a non-enabled state type, determining the fault state of the chip interrupt corresponding to the interrupt flag to be that the interrupt has failed.

In some embodiments, the hardware functional module 101 will not send out the interrupt signal when the second state type indicates the non-enabled state type. For example, in a judgment process after the CPU 103 receives the interrupt signal, when the CPU 103 receives the interrupt signal and the first state type is the set state, it is necessary to judge the fault state according to the second state type. When the second state type is the non-enabled state, it indicates that the hardware functional module 101 should not send the interrupt signal, that is, the CPU 103 cannot receive the interrupt signal. This situation is contradictory to the situation that the CPU 103 has received the interrupt signal, which indicates that the interrupt has failed.

Figure 6:
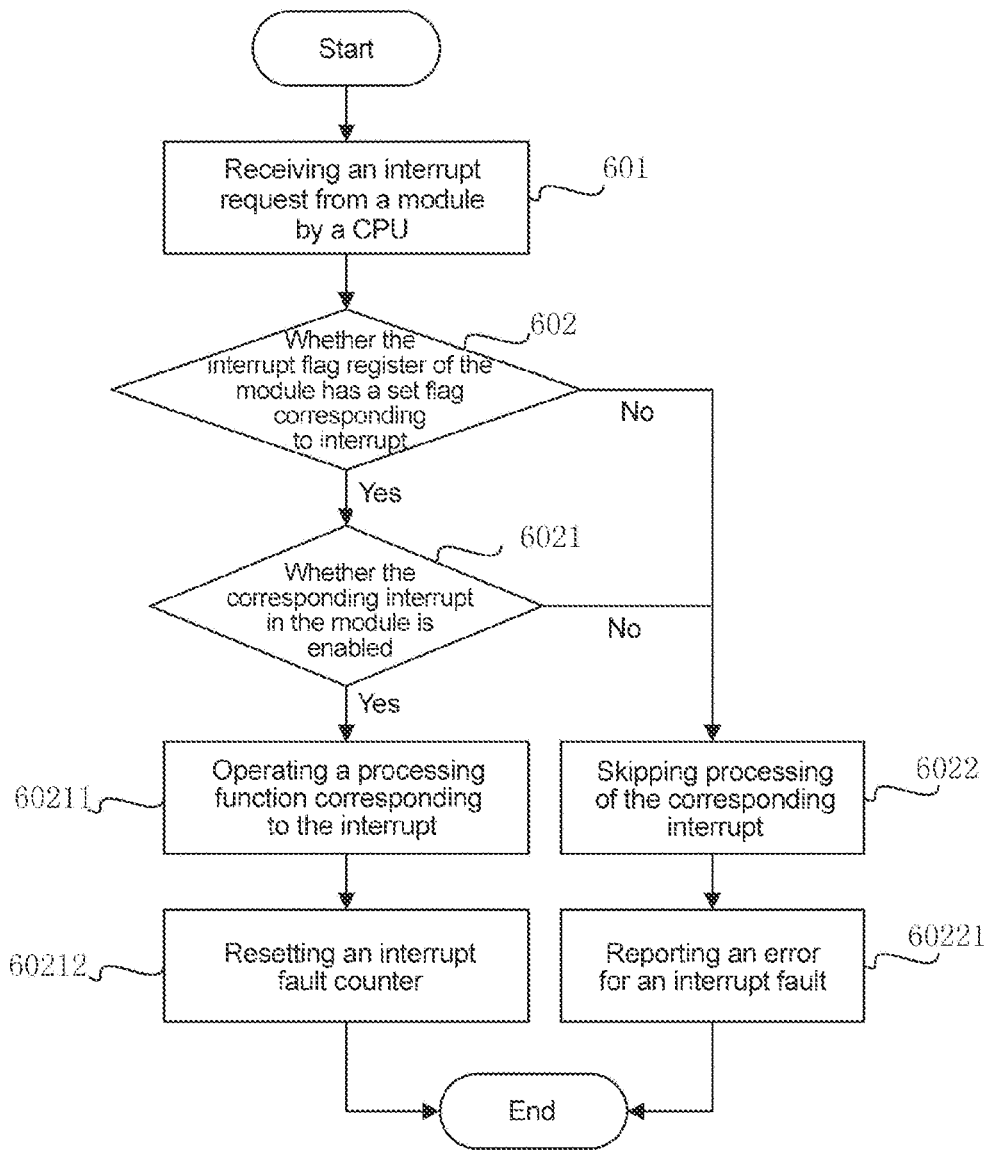
FIG. 6 is a schematic flow chart of processing an interrupt by a multi-core SOC interrupt program in a chip fault diagnosis method provided by still another exemplary embodiment of the present disclosure.

An exemplary process of processing the interrupt is shown in FIG. 6. FIG. 6 shows a chip interrupt processing procedure of the SOC, which is specifically as follows:

Step 601, receiving an interrupt request from a hardware functional module by a CPU.

Step 602, judging whether a first state type of a corresponding interrupt in an interrupt flag register of the hardware functional module is a set state, and proceeding to step 6021 when the first state type is the set state, while proceeding to step 6022 when the first state type is an unset state.

Step 6021, judging whether a corresponding second state type in the hardware functional module is an enabled state type, and proceeding to step 60211 when the second state type is the enabled state type, while proceeding to step 6022 when the second state type is a non-enabled state type.

Step 60211, operating a processing function corresponding to the interrupt. The process starts with that the CPU receives the interrupt signal. When the CPU receives the interrupt request from the hardware functional module, the interrupt fault state is judged according to the first state type. If the first state type is the set state type, further judgement is conducted according to the second state type. If the second state type is the enabled state type, it indicates that at present the hardware functional module is indeed subject to the interrupt and the interrupt should be processed. Therefore, the corresponding chip interrupt function is operated for processing.

Step 60212: resetting an interrupt fault counter. Since the processing of the interrupt involves access of multiple pieces of software to the chip interrupt, the interrupt fault counter will be used to record the number of times for the enabled state of the interrupt to be continuously accessed. When the number of times that a non-interrupt program continuously detects the enabled state of the interrupt flag does not exceed a specified number of times, it indicates that the current interrupt program is currently operating on a busy core, and the current chip interrupt needs to wait for the interrupt program until the interrupt program correctly processes the chip interrupt. After the processing is completed, the interrupt no longer exists, so the interrupt fault counter should be reset.

Step 6022: skipping processing of the corresponding interrupt.

Step 60221: reporting an error for an interrupt fault. In some embodiments, this step is performed after step 6022. When the first state type is the unset state type, it indicates that no interrupt has occurred at present, which is contradictory to that the CPU receives the interrupt signal, indicating that the interrupt has failed. Therefore, the processing of the chip interrupt corresponding to the interrupt signal is skipped and the error is reported. When the first state type is the set state, but the second state type is the non-enabled state type, because the second state type is the non-enabled state type, it indicates that the current first state type should not be expressed as the set state, and the CPU should not receive the interrupt signal, which is contradictory to the situation that the CPU receives the interrupt signal, so it can be determined that the fault has occurred. Therefore, the processing for the chip interrupt corresponding to the interrupt signal is skipped and the error is reported.

Figure 7:
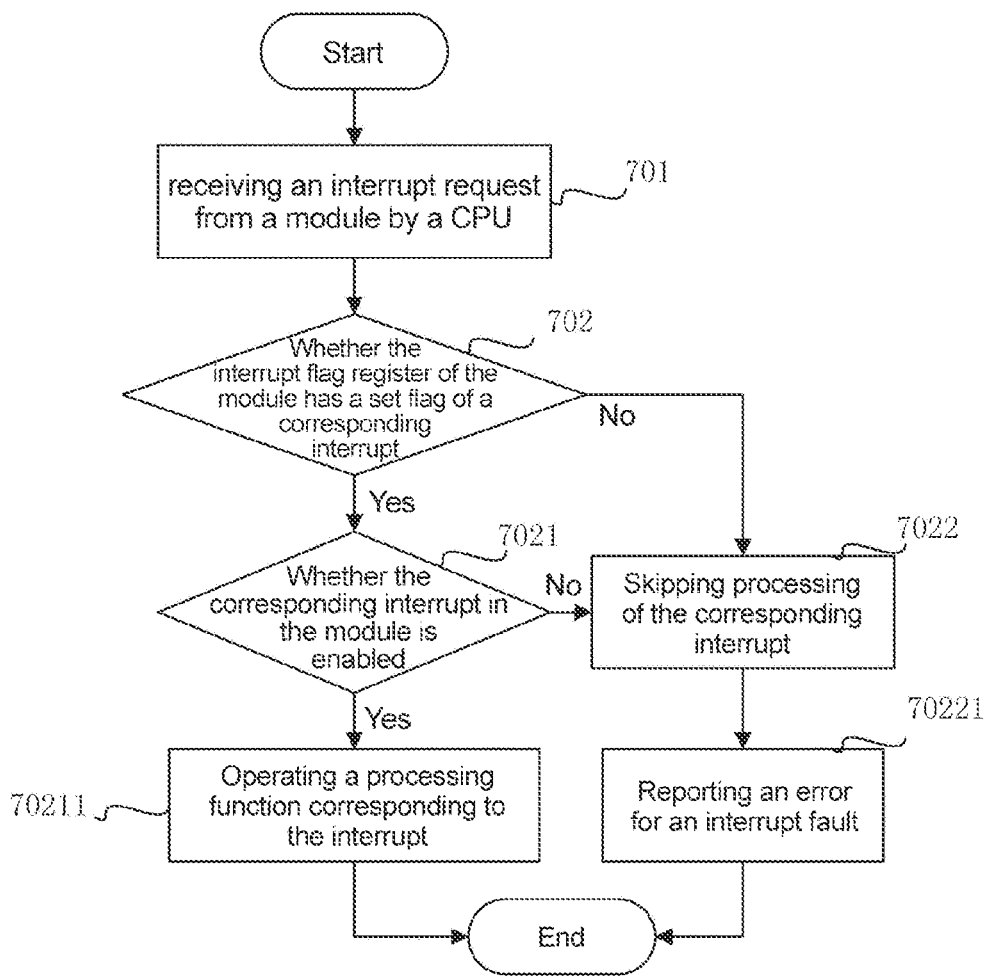
FIG. 7 is a schematic flow chart of processing an interrupt by a single-core SOC interrupt program in a chip fault diagnosis method provided by still another exemplary embodiment of the present disclosure.

FIG. 7 shows another interrupt processing procedure of the SOC, which is specifically as follows:

Step 701, receiving an interrupt request from a hardware functional module by a CPU.

Step 702, judging whether a first state type of a corresponding interrupt in an interrupt flag register of the hardware functional module is a set state, and proceeding to step 7021 when the first state type is the set state, while proceeding to step 7022 when the first state type is an unset state.

Step 7021, judging whether a corresponding second state type in the hardware functional module is an enabled state type, and proceeding to step 70211 when the second state type is the enabled state type, while proceeding to step 7022 when the second state type is a non-enabled state type.

Step 70211, operating a processing function corresponding to the interrupt. The process starts with that the CPU receives the interrupt signal. When the CPU receives the interrupt request from the hardware functional module, the interrupt fault state is judged according to the first state type. If the first state type is the set state type, further judgment is conducted according to the second state type. If the second state type is the enabled state type, it indicates that at present the hardware functional module is indeed subject to the interrupt and the interrupt should be processed. Therefore, the corresponding chip interrupt function is operated for processing.

Step 7022, skipping processing of the corresponding interrupt.

Step 70221, reporting an error for an interrupt fault. In some embodiments, this step is performed after step 7022. When the first state type is the unset state type, it indicates that no interrupt has occurred at present, which is contradictory to that the CPU 103 receives the interrupt signal, indicating that the interrupt has failed. Therefore, the processing of the chip interrupt corresponding to the interrupt signal is skipped and the error is reported. When the first state type is the set state, but the second state type is the non-enabled state, because the second state type is the non-enabled state, it indicates that the current first state type should not be expressed as the set state, and the CPU should not receive the interrupt signal, which is contradictory to the situation that the CPU receives the interrupt signal, so it can be determined that the fault has occurred. Therefore, the processing for the chip interrupt corresponding to the interrupt signal is skipped and the error is reported.

The process of processing an interrupt is different from that of the SOC in FIG. 6 in that: the process of recording query times by using the interrupt fault counter and resetting the interrupt fault counter is not involved during the processing procedure.

Figure 8:
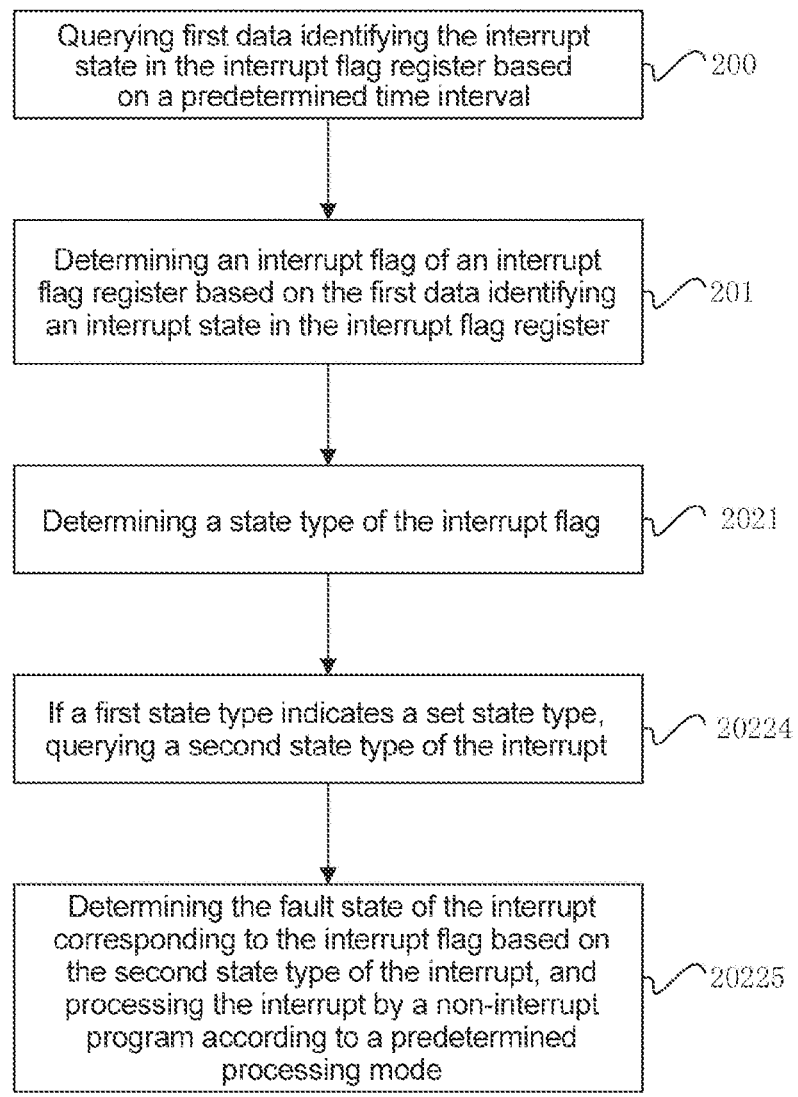
FIG. 8 is a schematic flow chart of determining an interrupt fault state in a chip fault diagnosis method provided by still another exemplary embodiment of the present disclosure.

As shown in FIG. 8, based on the above embodiment shown in FIG. 3, before step 201, the following steps are included:

Step 200, querying the first data identifying the interrupt state in the interrupt flag register based on a predetermined time interval;

In some embodiments, it is necessary to periodically query the first data in the interrupt flag register 1011, so as to find and process the chip interrupt fault in time. For example, in a judgment process when the CPU 103 executes a non-interrupt program, while executing the non-interrupt program, the CPU 103 queries the first data in the interrupt flag register 1011 once every predetermined time interval. In some cases, the chip interrupt fault may lead to incorrect signal sending. The above processing method can diagnose the interrupt fault even when the correct interrupt signal cannot be sent as the communication link, the hardware functional module 101 or the interrupt controller 102 fails.

Step 2022 includes:

Step 20224, querying the second state type if the first state type indicates the set state type.

In some embodiments, it is found through periodic query that when the first state type indicates the set state type, the state type indicates that the fault has occurred. Because the first state type is obtained through query, the CPU 103 has not received the interrupt signal at present, and the set state of the first state type is contradictory to the situation that at present the CPU 103 has not received the interrupt signal, indicating that the interrupt has failed. At this time, in order to further confirm the current fault of the chip interrupt, it is necessary to further query the second state type for confirmation.

Step 20225, determining the fault state of the chip interrupt corresponding to the interrupt flag based on the second state type of the interrupt, and processing the interrupt by a non-interrupt program according to a predetermined processing mode.

In some embodiments, when the second state type is the enabled state, it indicates that the first state type of the hardware functional module 101 is allowed to be expressed as the set state type. Taking the periodical query of the CPU 103 as an example: when the first state type is the set state type and the second state type is the enabled state, but the CPU 103 does not receive the interrupt signal, it indicates that the interrupt has failed. However, since the interrupt has occurred and should be processed, the non-interrupt program is used to process the interrupt and then confirm the failed state of the interrupt, so that the interrupt is processed as soon as possible. When the second state type is the non-enabled state, it indicates that the current first state type should not be expressed as the set state, and the fault of the interrupt can be directly confirmed.

Figure 9:
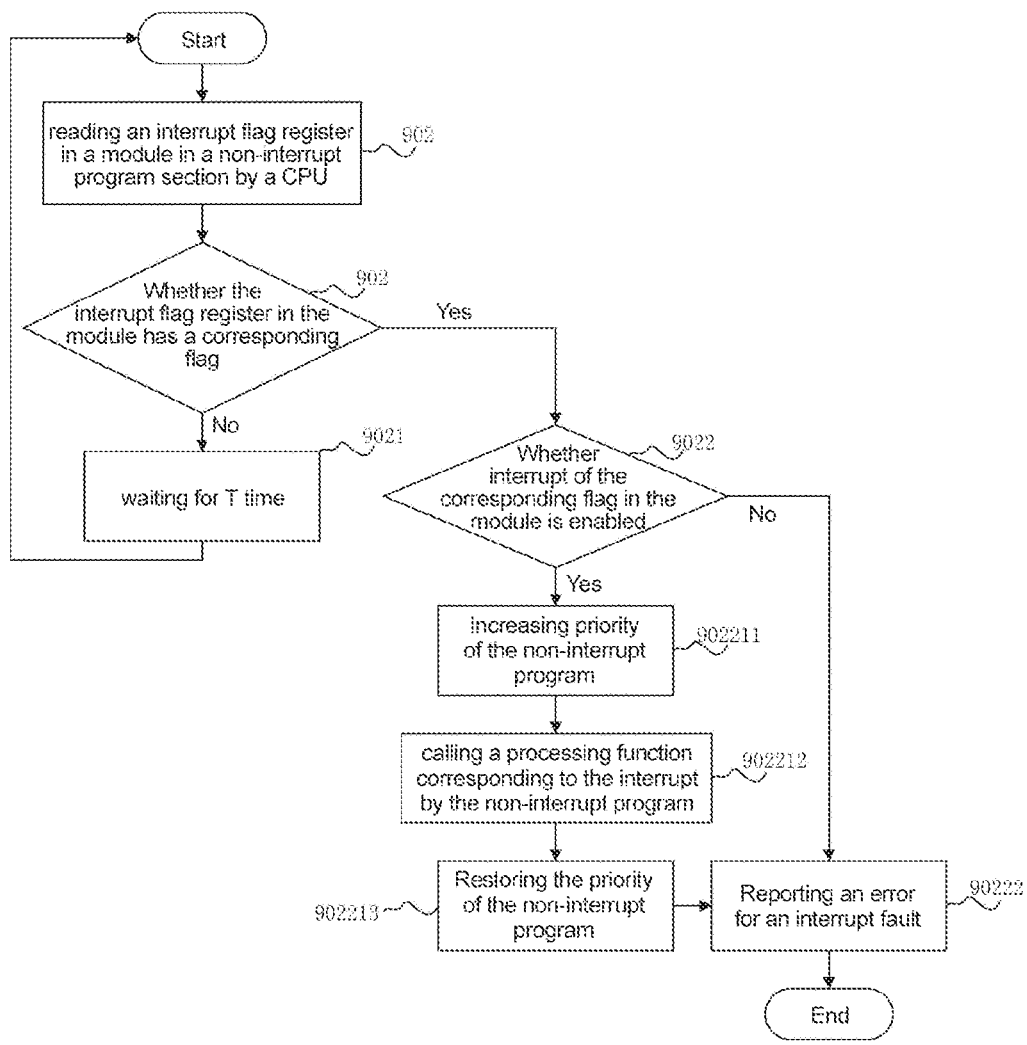
FIG. 9 is a schematic flow chart of processing an interrupt by a single-core SOC non-interrupt program in a chip fault diagnosis method provided by still another exemplary embodiment of the present disclosure.

FIG. 9 shows a flow chart of a specific procedure of processing the interrupt by the SOC, executing each step of the above embodiment. The procedure is specifically as follows:

Step 901, reading an interrupt flag register in a module in a non-interrupt program section by CPU 103.

Step 902, determining whether a first state type in the interrupt flag register in the module is a set state or not, and proceeding to step 9021 when the first state type is a set state, while proceeding to step 9022 when the first state type is an unset state.

Step 9021, waiting for T time, and then returning to step 901. This step enables the query step to be repeatedly executed according to predetermined time, so that the fault of chip interrupt can be periodically detected.

Step 9022, querying a second state type of a corresponding interrupt flag in the module, and proceeding to step 902211 when the second state type is an enabled state, while proceeding to step 90222 when the second state type is a non-enabled state.

Step 902211, increasing priority of a non-interrupt program. In order to avoid break of the non-interrupt program in the process of processing the interrupt, the priority of the non-interrupt program is increased.

Step 902212, calling a processing function corresponding to the interrupt by the non-interrupt program.

Step 902213, restoring the priority of the non-interrupt program. After processing, the non-interrupt program is restored to the original priority thereof, so as to avoid influencing other program with higher priority than that of the non-interrupt program.

Step 90222, reporting an error for an interrupt fault. In step 902, when the first state type is the set state type, it indicates that the interrupt has occurred at present, and the CPU has not received the interrupt signal. At this time, the two situations are contradictory, indicating that the chip interrupt fails. In step 9022, when the second state type is the non-enabled state, the first state type should not be expressed as the set state, and at this time, the two situations are contradictory, so it can also indicate that at present the chip interrupt has failed.

Figure 10:
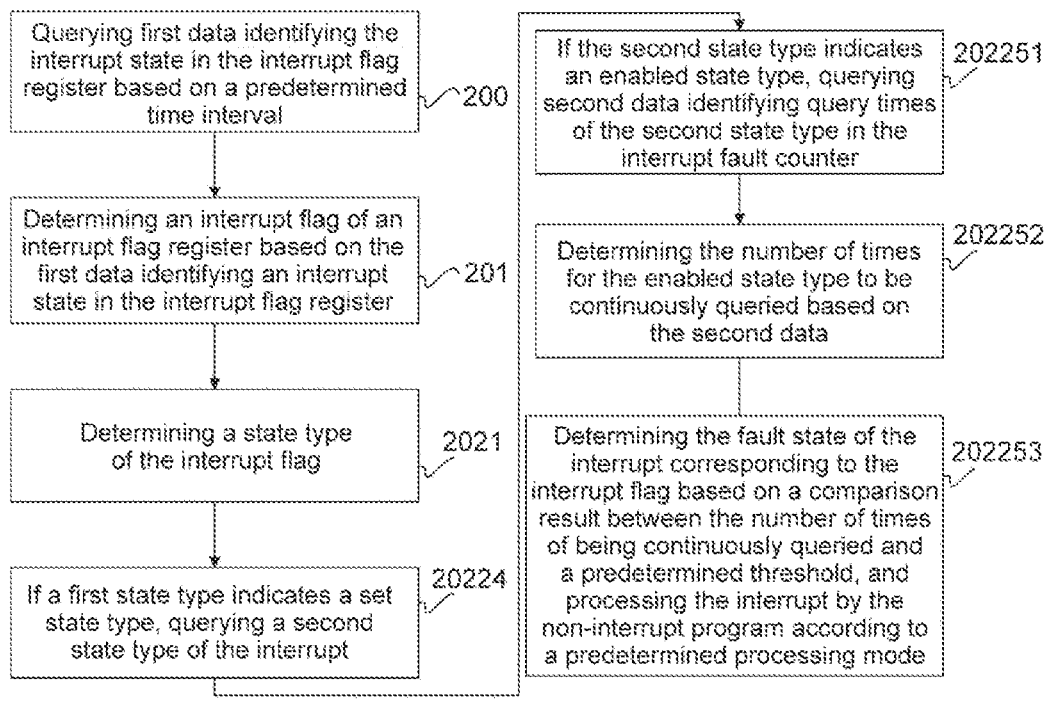
FIG. 10 is a schematic flow chart of determining an interrupt fault state in a chip fault diagnosis method provided by still another exemplary embodiment of the present disclosure.

As shown in FIG. 10, based on the above embodiment shown in FIG. 8, step 20225 includes:

Step 202251, if the second state type indicates an enabled state type, querying second data identifying a number of query times of the second state type in the interrupt fault counter;

In some embodiments, because the interrupt processing involves access of multiple pieces of software to the chip interrupt, an interrupt fault counter is used to record the number of times for the enabled state of the interrupt to be continuously accessed. When the non-interrupt program continuously detects that the enabled state of the second state type does not exceed a specified number of times, it indicates that the current interrupt program is currently operating on a busy core. The current chip interrupt needs to wait for the interrupt program until the interrupt program correctly process the chip interrupt. In order to record the number of times for the enabled state of the current chip interrupt to be continuously accessed, the interrupt fault counter is used to record the number of times that multiple cores query about the enabled state type of the interrupt. The second data is a value stored in the interrupt fault counter, and the stored value in the interrupt fault counter will be increased by 1 every time the enabled state type is queried.

Step 202252, determining the number of times for the enabled state type to be continuously queried based on the second data;

In some embodiments, after each interrupt is processed, the interrupt fault counter is reset, so the value in the interrupt fault counter is the number of times for the enabled state type of the current interrupt to be continuously queried.

Step 202253, determining the fault state of the chip interrupt corresponding to the interrupt flag based on a comparison result between the number of times of being continuously queried and a predetermined threshold, and processing the interrupt by a non-interrupt program according to a predetermined processing mode.

In some embodiments, the predetermined threshold is set according to information such as an emergency state of the interrupt or the module in which the interrupt occurs. For example, the predetermined threshold may be set to 2. The more urgent the emergency state of the interrupt is, the smaller the threshold should be set. The more important the module in which the interrupt occurs will be, the smaller the predetermined threshold should be set too.

Figure 11:
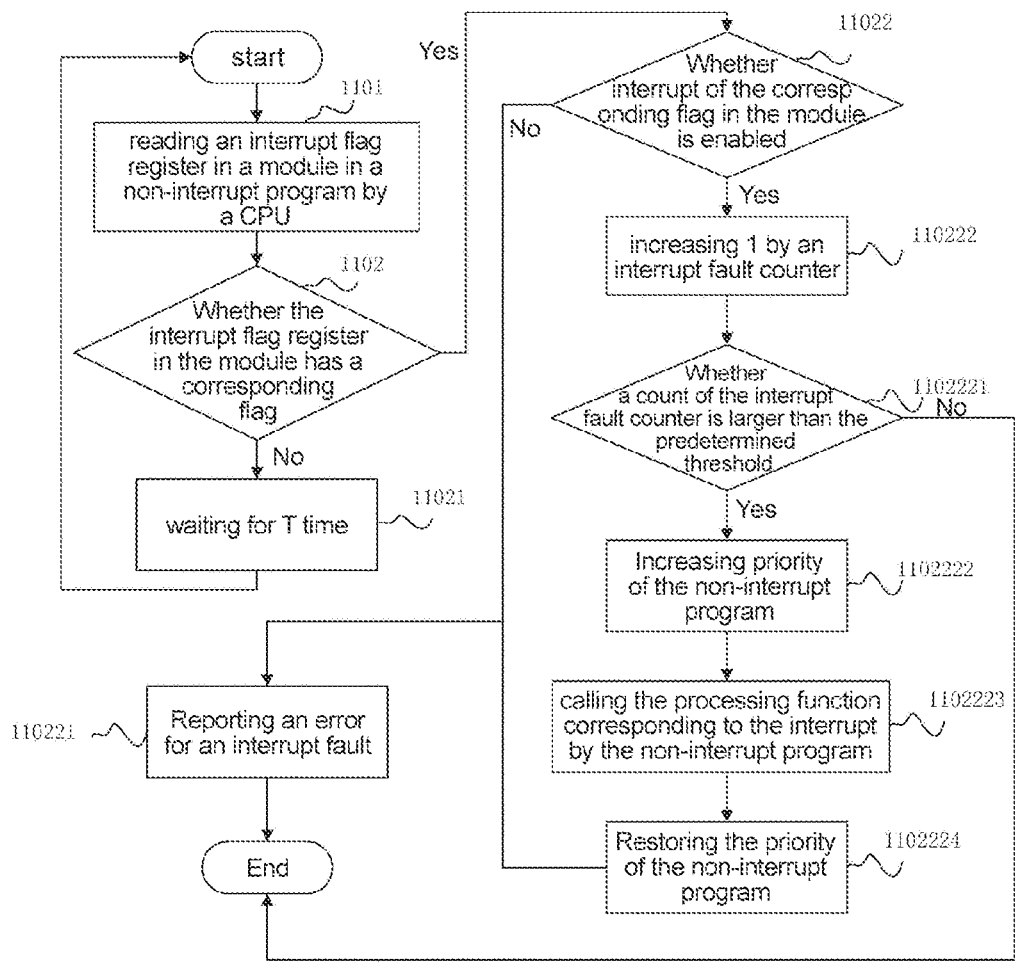
FIG. 11 is a schematic flow chart of processing an interrupt by a multi-core SOC non-interrupt program in a chip fault diagnosis method provided by still another exemplary embodiment of the present disclosure.

As a preferred embodiment, FIG. 11 shows a specific flow chart of processing an interrupt by a multi-core SOC. The specific steps are as follows:

Step 1101, reading, by a CPU, an interrupt flag register in a module in a non-interrupt program.

Step 1102, determining whether a first state type in the interrupt flag register in the module is a set state type or not, and proceeding to step 11021 when the first state type is the set state type, while proceeding to step 11022 when the first state type is an unset state type.

Step 11021, waiting for T time and then returning to step 1101. This step enables the query step to be repeatedly executed according to predetermined time, so that the fault of chip interrupt can be periodically detected.

Step 11022, querying a second state type of a corresponding interrupt flag in the module, proceeding to step 110222 when the second state type is an enabled state, while proceeding to step 110221 when the second state type is a non-enabled state.

Step 110222: increasing 1 by an interrupt fault counter.

Step 1102221: judging whether a count of the interrupt fault counter is larger than a predetermined threshold, and proceeding to step 1102222 when the count is larger than the predetermined threshold, while ending the current interrupt processing flow when the count is not larger than the predetermined threshold. The difference between FIG. 11 and FIG. 9 is that in FIG. 11, after confirming that the second state type is the enabled state, a processing emergency state is determined by querying the interrupt fault counter, and when the number of times of being continuously queried exceeds the predetermined threshold, it indicates that the current interrupt needs to be processed as soon as possible, thus the interrupt should be processed before confirmation of the failed state of the interrupt; when the number of times of being continuously queried does not exceed the predetermined threshold, it indicates that the current interrupt does not need to be processed as soon as possible, thus the failed state of the interrupt is directly confirmed.

Step 1102222, increasing priority of a non-interrupt program. In order to avoid break of the non-interrupt program in the process of processing the interrupt, the priority of the non-interrupt program is increased.

Step 1102223, calling, by the non-interrupt program, a processing function corresponding to an interrupt.

Step 1102224, restoring the priority of the non-interrupt program.

After processing, the non-interrupt program is restored to the original priority thereof, so as to avoid influencing other program with higher priority than that of the non-interrupt program.

Step 110221, reporting an error for an interrupt fault. In step 1102, when the first state type is the set state type, it indicates that the interrupt has occurred at present, and the CPU has not received the interrupt signal. At this time, the two situations are contradictory, indicating that the chip interrupt fails. In step 11022, when the second state type is the non-enabled state, the first state type should not be expressed as the set state, at this time, the two situations are contradictory. Therefore it can also indicate that at present the chip interrupt has failed.

Exemplary Device

Figure 12:
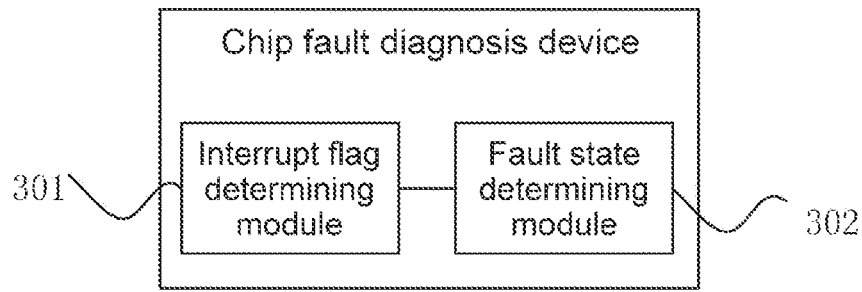
FIG. 12 is a schematic diagram of a chip fault diagnosis device provided by still another exemplary embodiment of the present disclosure.

FIG. 12 is a chip fault diagnosis device provided by an exemplary embodiment of the present disclosure. The present embodiment can be applied to electronic equipment, and as shown in FIG. 12, includes the following modules:

An interrupt flag determining module 301, which is configured to determine an interrupt flag of an interrupt flag register based on first data identifying an interrupt state in the interrupt flag register;

In some embodiments, the interrupt flag register 1011 is the interrupt flag register 1011 in the hardware functional module 101, and the hardware functional module 101 may be a network module, an input/output module, a storage module, or an image acquisition module, etc. For example, the network module may be an Ethernet module, and the image acquisition module may be a camera. The first data refers to data set in a preset field in the interrupt flag register 1011, which changes based on the interrupt. For example, a preset bit of the preset field in the interrupt flag register 1011 is 1 when the interrupt occurs and is 0 when the interrupt does not occur. Hence, if it is detected that the preset bit in the preset field becomes 1, it indicates that the interrupt occurs. The interrupt flag is a flag corresponding to the first data, and the interrupt flag indicates whether an interrupt has occurred at present. For example, when the preset bit in the first data is 1, it indicates that the current interrupt flag has been set, that is, an interrupt has occurred; and when the preset bit in the first data is 0, it indicates that the current interrupt flag is not set, that is, no interrupt has occurred. When an interrupt occurs, the preset bit in the first data becomes 1, that is, the hardware functional module 101 sets the interrupt flag, and meanwhile, the hardware functional module 101 transmits the information of the interrupt to the interrupt controller 102 via the SOC on-chip bus or the interrupt signal line. After receiving the interrupt information, the interrupt controller 102 sends the interrupt signal to the designated CPU 103.

A fault state determining module 302, which is configured to determine a fault state of chip interrupt corresponding to the interrupt flag based on the interrupt flag.

In some embodiments, the interrupt flag identifies the current interrupt state. Under a normal state, the hardware functional module 101 will send an interrupt signal to the CPU 103 through the interrupt controller 102 while setting the interrupt flag. Regardless of whether the CPU 103 receives the interrupt signal sent by the interrupt controller 102 or not, the CPU 103 can determine the interrupt flag according to the first data in the interrupt flag register 1011, and judge the fault state of the chip interrupt according to the interrupt flag. For example, when the CPU 103 receives the interrupt signal sent by the interrupt controller 102, the preset bit of the first data is 0, that is, the interrupt flag is in an unset state. At this time, the unset state of the interrupt flag indicates that no interrupt has occurred at present, while receiving the interrupt signal indicates that an interrupt has occurred at present, which indicates that the interrupt has failed. For another example, when the CPU 103 does not receive the interrupt signal sent by the interrupt controller 102, the preset bit of the interrupt flag register 1011 is 1, that is, the interrupt flag is set. At this time, the interrupt flag indicates that an interrupt has occurred at present, while failure to receive the interrupt signal indicates that the interrupt has not occurred at present, which also indicates that the interrupt has failed.

In the chip fault diagnosis device provided in the present disclosure, since the interrupt flag in the interrupt flag register 1011 is used to identify the interrupt state of the chip, whether an interrupt signal is received or not, verification can be performed through the interrupt state represented by the interrupt flag, so that the fault state of the chip can be determined in time, which is beneficial for timely troubleshooting and processing of the interrupt.

Figure 13:
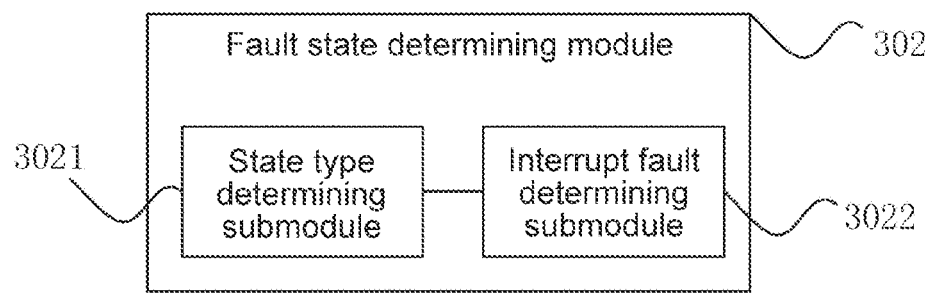
FIG. 13 is a schematic diagram of a fault state determining module of a chip fault diagnosis device provided by still another exemplary embodiment of the present disclosure.

As shown in FIG. 13, based on the implementation shown in FIG. 12, the fault state determining module 302 may include the following submodules:

A state type determining submodule 3021, which is configured to determine a state type of the interrupt flag;

In some embodiments, the state types of the interrupt flag include a first state type identifying an interrupt occurrence state and a second state type of an interrupt enabling state. In some preferred embodiments, the priority of the state type of the interrupt flag can be determined among the above two types of states. For example, since the first state type directly identifies whether the interrupt occurs or not, while the second state type has a control effect on the first state type, that is, the second state type indirectly controls sending of the interrupt signal, the priority of the first state type is set to be higher and the priority of the second state type is set to be lower. In this way, the fault of chip interrupt can be directly confirmed by the first state type which directly characterizes whether the interrupt occurs or not. When the fault of chip interrupt cannot be confirmed by the first state type, it can be further confirmed by the second state type, thus guaranteeing both efficiency and accuracy. In general, the state type of the interrupt flag is formed by the combination of the first state type and the second state type of the interrupt. However, when the state type of the chip interrupt can be determined by only one of the states, one of them can be used for judgment. Specifically, the first state type indicates whether the chip interrupt has occurred at present, while the second state type indicates whether the current chip interrupt is shielded. For example, when the second state type is an enabled state, it indicates that the interrupt signal can be sent to the CPU 103 when the first state type can be expressed as a set state, and when the second state type is a non-enabled state, it indicates that the interrupt signal cannot be sent to the CPU 103 when the first state type cannot be expressed as a set state.

An interrupt fault determining submodule 3022, which is configured to determine the fault state of the chip interrupt corresponding to the interrupt flag based on the state type of the interrupt flag.

In some embodiments, the state type of the interrupt flag is obtained by a combination of the first state type and the second state type, and the fault state of the chip interrupt corresponding to the interrupt flag can be obtained by verifying this state type and the situation that at present the CPU 103 receives or does not receive the interrupt signal. For example, the first state type is the set state and the second state type is an enabled state. At this time, the first state type indicates that the chip interrupt has occurred at present, but the CPU 103 has not received the interrupt signal at present. At this time, the state of not receiving the interrupt signal indicates that the chip interrupt has not occurred at present. Through this contradictory situation, it can be judged that the fault state of the chip interrupt is a failed state. In some embodiments, the state type of the interrupt flag is used for judgment when whether the interrupt fails can be judged by using only the set or unset state type of the first state type. For example, at present, the CPU 103 has received the interrupt signal, but the first state type is an unset state, at this time, the state of receiving the interrupt signal indicates that the chip interrupt has occurred at present, while the first state type indicates that the chip interrupt has not occurred at present, so it can be judged that the interrupt has failed through this state, and it is not necessary to query the second state type.

In the above embodiment, the state type of the interrupt flag is used to verify whether the current situation that the CPU 103 receives or does not receive the interrupt signal is correct, so as to judge whether the interrupt fails. No matter whether the interrupt signal is received or not at present, the interrupt fault can be diagnosed.

Figure 14:
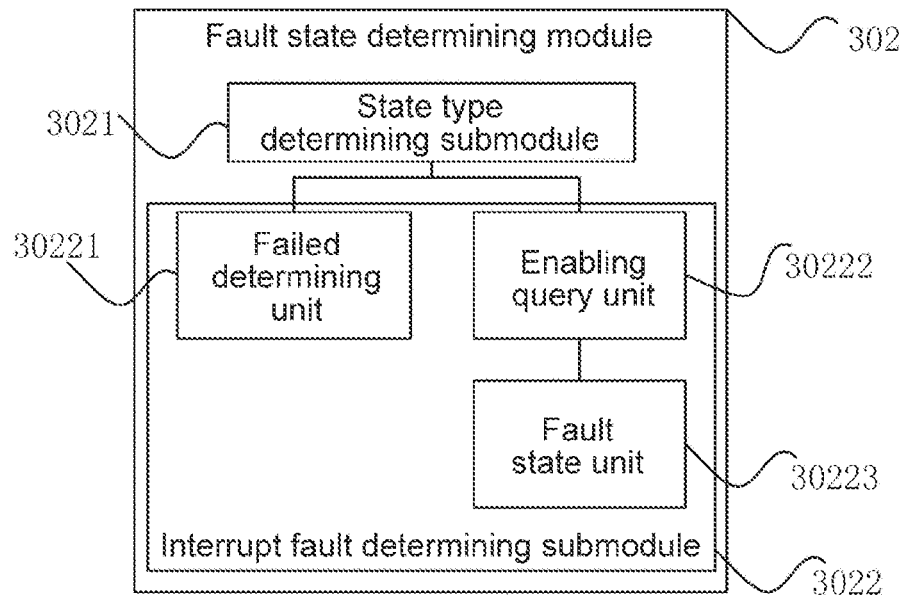
FIG. 14 is a schematic diagram of a fault state determining module of a chip fault diagnosis device provided by still another exemplary embodiment of the present disclosure.

As shown in FIG. 14, based on the embodiment shown in FIG. 13, the interrupt fault determining submodule is specifically used to determine the fault state of the chip interrupt corresponding to the interrupt flag based on the first state type indicating the interrupt occurrence state and the second state type indicating the interrupt enabling state.

In some embodiments, the interrupt flag register 1011 may be, for example, a register, and the interrupt flag register 1011 includes at least two preset fields, data stored in one preset field of which is used to represent the first state type of the interrupt flag, and the other preset field of which is used to represent the second state type of the interrupt flag. The state types of the interrupt flag include the first state type and the second state type. For example, the interrupt flag register 1011 may also be a combination of two registers, wherein data stored in a preset field of one register is used to represent the first state type of the interrupt flag, and data stored in a preset field of the other register is used to represent the second state type of the interrupt flag. The first state type is used to indicate the interrupt state of the chip. When the first state type is the set state type, it indicates that the interrupt has occurred at present; and when the first state type is the unset state, it indicates that the interrupt has not occurred at present. The state type of the enabling flag is used to indicate whether the first state type is allowed to change. When the second state type is the enabled state type, it indicates that the first state type is allowed to change at present, that is, the first state type is allowed to change to the set state when the interrupt occurs. When the second state type is the non-enabled state, it indicates that the first state type is not allowed to change at present, and even if the interrupt occurs, the first state type is still the unset state.

The interrupt fault determining submodule 3022 includes:

A failed determining unit 30221, which is configured to determine that the fault state of the chip interrupt corresponding to the interrupt flag is that the interrupt has failed if the first state type indicates the unset state type;

In some embodiments, the set or unset state type of the first state type directly influences sending of the interrupt signal. When the set or unset state of the first state type is inconsistent with the state of the interrupt signal, it can be directly judged that the chip interrupt fails. For example, in a judgment process after the CPU 103 receives the interrupt signal, when the CPU 103 receives the interrupt signal, the interrupt fault is judged according to the first state type. At this time, the first state type is first determined. When the first state type is displayed to be the unset state, the first state type indicates that no interrupt has occurred at present, while the interrupt signal indicates that the interrupt has occurred at present. The contradiction between both determines that the fault state of the current interrupt is a fault that has occurred.

An enabling query unit 30222, which is configured to query the second state type if the first state type indicates the set state type;

In some embodiments, the second state type determines whether the first state type can be expressed as the set state type when the chip interrupt occurs, so the second state type also has a certain characterization effect on the fault state of the chip interrupt. For example, in a judgement process after the CPU 103 receives the interrupt signal, when the CPU 103 receives the interrupt signal, it judges the interrupt fault according to the first state type. At this time, the first state type of the interrupt flag is first determined. When the first state type is the set state, the first state type indicates that the interrupt has occurred at present, and the interrupt signal also indicates that the fault has occurred at present. Both of them are consistent. However, whether the CPU 103 can receive the interrupt signal or not is still influenced by the second state type, so that the second state type should be further verified.

A fault state unit 30223, which is configured to determine the fault state of the chip interrupt corresponding to the interrupt flag based on the second state type.

In some embodiments, the second state type can influence whether the first state type can be expressed as the set state, thus influencing sending of interrupt signals. Therefore, based on the second state type, the fault state of chip interrupt can be further confirmed. For example, in a judgment process after the CPU 103 receives the interrupt signal, when the second state type is the non-enabled state, it indicates that the interrupt flag cannot be expressed as the set state, so that the interrupt signal cannot be sent out, which indicates that the CPU 103 should not receive the interrupt signal at present. At this time, if the CPU 103 receives the interrupt signal, it is contradictory to the second state type, and this contradictory situation indicates that the current interrupt fails.

In the above embodiment, the signal received by the CPU 103 is further verified by the second state type, so that the fault state of the interrupt can be judged more accurately.

Figure 15:
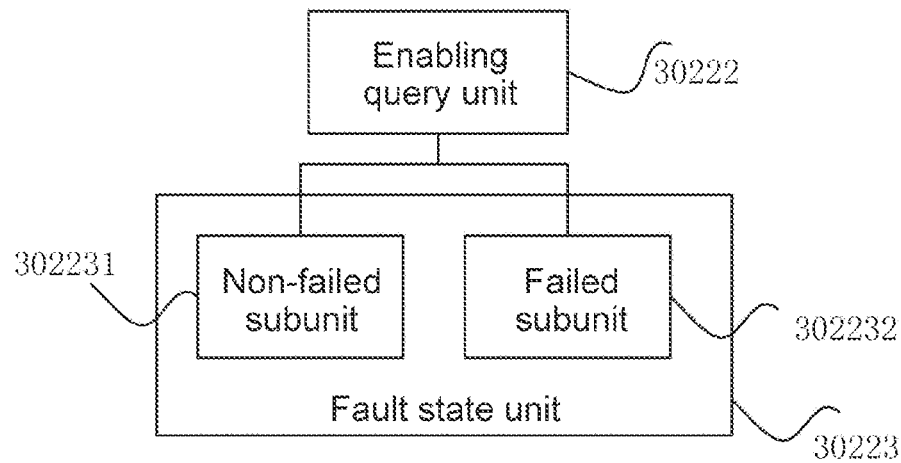
FIG. 15 is a partial schematic diagram of a fault state determining module of a chip fault diagnosis device provided by still another exemplary embodiment of the present disclosure.

As shown in FIG. 15, in the above embodiment shown in FIG. 14, the fault state unit 30223 includes the following subunits:

A non-failed subunit 302231, which is configured to determine that the fault state of the chip interrupt corresponding to the interrupt flag is that the interrupt has not failed if the second state type indicates the enabled state type;

In some embodiments, when the second state type indicates the enabled state type, the first data indicating the interrupt flag will change with the occurrence and processing of the interrupt, that is, when the interrupt occurs, the first state type indicates the set state and sends an interrupt signal at the same time. In a judgement process after the CPU 103 receives the interrupt signal as an example, when the CPU 103 receives the interrupt signal and the first state type is the set state, it is necessary to judge the fault state according to the second state type. When the second state type is the enabled state, it indicates that the first state type can be set, that is, the CPU 103 can receive the interrupt signal. This situation is consistent with the situation that the CPU 103 has received the interrupt signal, which indicates that the interrupt has not failed.

A failed subunit 302232, which is configured to determine that the fault state of the chip interrupt corresponding to the interrupt flag is that the interrupt has failed if the second state type indicates the non-enabled state type.

In some embodiments, the hardware functional module 101 will not send out the interrupt signal when the second state type indicates the non-enabled state type. For example, in a judgment process after the CPU 103 receives the interrupt signal, when the CPU 103 receives the interrupt signal and the first state type is the set state, it is necessary to judge the fault state according to the second state type. When the second state type is the non-enabled state, it indicates that the hardware functional module 101 should not send out the interrupt signal, that is, the CPU 103 cannot receive the interrupt signal. This situation is contradictory to the situation that the CPU 103 has received the interrupt signal, which indicates that the interrupt has failed.

An exemplary procedure of processing the interrupt is shown in FIG. 6. FIG. 6 shows a chip interrupt processing procedure of the SOC, which is specifically as follows:

Step 601, receiving an interrupt request from a hardware functional module by a CPU.

Step 602, judging whether a first state type of a corresponding interrupt in an interrupt flag register of the hardware functional module is a set state type, and proceeding to step 6021 when the first state type is the set state type, while proceeding to step 6022 when the first state type is an unset state type.

Step 6021, judging whether a corresponding second state type in the hardware functional module is an enabled state type, and proceeding to step 60211 when the second state type is the enabled state type, while proceeding to step 6022 when the second state type is a non-enabled state type.

Step 60211, operating a processing function corresponding to an interrupt. The process starts with that the CPU receives the interrupt signal.

When the CPU receives the interrupt request from the hardware functional module, the interrupt fault state is judged according to the first state type. If the first state type is the set state type, further judgement is conducted according to the second state type. If the second state type is the enabled state type, it indicates that at present the hardware functional module is indeed subject to the interrupt and the interrupt should be processed. Therefore, the corresponding chip interrupt function is operated for processing.

Step 60212, resetting an interrupt fault counter. Since the processing of the interrupt involves access of multiple pieces of software to the chip interrupt, the interrupt fault counter will be used to record the number of times for the enabled state of the interrupt to be continuously accessed. When a number of times that a non-interrupt program continuously detects the enabled state of the interrupt flag does not exceed a specified number of times, it indicates that the current interrupt program is currently operating on a busy core, and the current chip interrupt needs to wait for the interrupt program until the interrupt program correctly processes the chip interrupt. After the processing is completed, the interrupt no longer exists, so the interrupt fault counter should be reset.

Step 6022, skipping processing of the corresponding interrupt.

Step 60221, reporting an error for an interrupt fault. In some embodiments, this step is performed after step 6022. When the first state type is the unset state type, it indicates that no interrupt has occurred at present, which is contradictory to that the CPU receives the interrupt signal, indicating that the interrupt has failed. Therefore, the processing of the chip interrupt corresponding to the interrupt signal is skipped and the error is reported. When the first state type is the set state, but the second state type is the non-enabled state type, because the second state type is the non-enabled state type, it indicates that the current first state type should not be expressed as the set state, and the CPU should not receive the interrupt signal, which is contradictory to the situation that the CPU receives the interrupt signal, so it can be determined that the fault has occurred. Therefore, the processing for the chip interrupt corresponding to the interrupt signal is skipped and the error is reported.

FIG. 7 shows another interrupt processing procedure of the SOC, which is specifically as follows:

Step 701, receiving an interrupt request from a hardware functional module by a CPU.

Step 702, judging whether a first state type of a corresponding interrupt in an interrupt flag register of the hardware functional module is a set state type, and proceeding to step 7021 when the first state type is the set state, while proceeding to step 7022 when the first state type is an unset state type.

Step 7021, judging whether a corresponding second state type in the hardware functional module is an enabled state type, and proceeding to step 70211 when the second state type is the enabled state type, while proceeding to step 7022 when the second state type is a non-enabled state type.

Step 70211, operating a processing function corresponding to an interrupt. The process starts with that the CPU receives the interrupt signal.

When the CPU receives the interrupt request from the hardware functional module, the interrupt fault state is judged according to the first state type. If the first state type is the set state type, further judgment is conducted according to the second state type. If the second state type is the enabled state type, it indicates that at present the hardware functional module is indeed subject to the interrupt and the interrupt should be processed. Therefore, the corresponding chip interrupt function is operated for processing.

Step 7022, skipping processing of the corresponding interrupt.

Step 70221, reporting an error for an interrupt fault. In some embodiments, this step is performed after performing step 7022. When the first state type is the unset state type, it indicates that no interrupt has occurred at present, which is contradictory to that the CPU 103 receives the interrupt signal, indicating that the interrupt has failed. Therefore, the processing of the chip interrupt corresponding to the interrupt signal is skipped and the error is reported. When the first state type is the set state, but the second state type is the non-enabled state, because the second state type is the non-enabled state, it indicates that the current first state type should not be expressed as the set state, and the CPU should not receive the interrupt signal, which is contradictory to the situation that the CPU receives the interrupt signal, so it can be determined that the fault has occurred. Therefore, the processing for the chip interrupt corresponding to the interrupt signal is skipped and the error is reported.

The procedure of processing interrupt is different from that of the SOC in FIG. 6 in that: the process of recording query times by using the interrupt fault counter and resetting the interrupt fault counter is not involved during the processing procedure.

Figure 16:
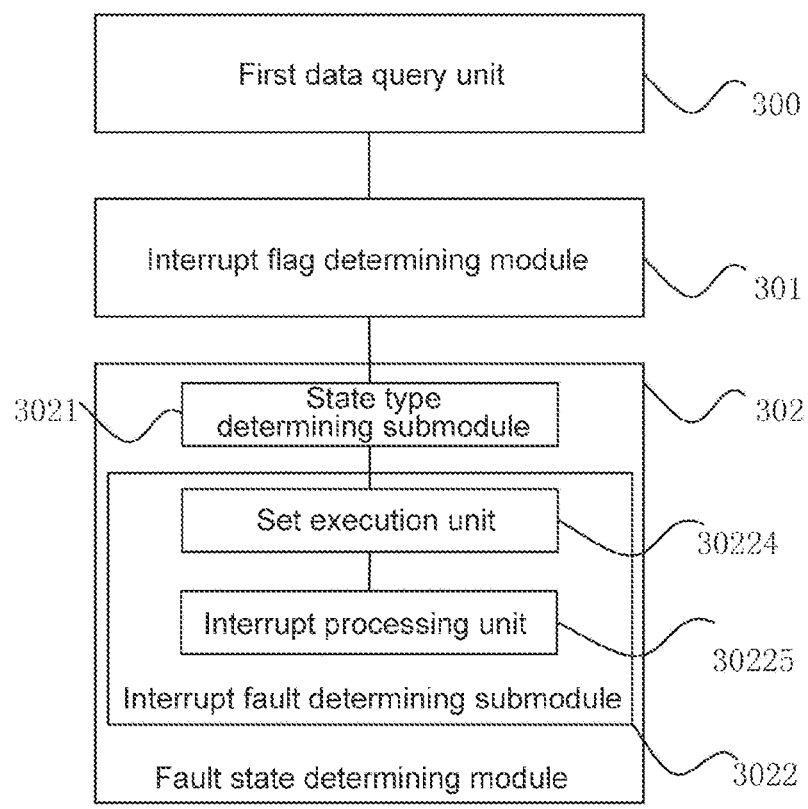
FIG. 16 is a schematic diagram of a chip fault diagnosis device provided by still another exemplary embodiment of the present disclosure.

As shown in FIG. 16, based on the above embodiment shown in FIG. 13, the chip fault diagnosis device further includes:

A first data query unit 300, which is configured to query the first data identifying the interrupt state in the interrupt flag register based on a predetermined time interval;

In some embodiments, it is necessary to periodically query the first data in the interrupt flag register 1011, so as to find and process the chip interrupt fault in time. For example, in a judgment process when the CPU 103 executes the non-interrupt program, while executing the non-interrupt program, the CPU 103 queries the first data in the interrupt flag register 1011 once every predetermined time interval. In some cases, the chip interrupt fault may lead to incorrect signal sending. The above processing method can diagnose the interrupt fault even when the correct interrupt signal cannot be sent as the communication link fails, the hardware functional module 101 fails or the interrupt controller 102 fails.

The interrupt fault determining submodule 3022 includes:

A set execution unit 30224, which is configured to query the second state type if the first state type indicates the set state type;

In some embodiments, it is found through periodic query that when the first state type indicates the set state type, the state type indicates that the fault has occurred. Because the first state type is obtained through query, the CPU 103 has not received an interrupt signal at present, and the set state of the first state type is contradictory to the current situation that the CPU 103 has not received the interrupt signal, indicating that the interrupt has failed. At this time, in order to further confirm the current fault of chip interrupt, it is necessary to further query the second state type for confirmation.

An interrupt processing unit 30225, which is configured to determine the fault state of the chip interrupt corresponding to the interrupt flag based on the second state type of the interrupt, and process the interrupt by a non-interrupt program according to a predetermined processing mode.

In some embodiments, when the second state type is the enabled state, it indicates that the first state type of the hardware functional module 101 is allowed to be expressed as the set state type. Taking the periodical query of the CPU 103 as an example, when the first state type indicates the set state type and the second state type is the enabled state, but the CPU 103 does not receive the interrupt signal, it indicates that the interrupt has failed. However, since the interrupt has occurred and should be processed, the non-interrupt program is used to process the interrupt and then confirm the failed state of the interrupt, so that the interrupt is processed as soon as possible. When the second state type is the non-enabled state, it indicates that the current first state type should not be expressed as the set state, and the fault of the interrupt can be directly confirmed.

FIG. 9 shows a flow chart of executing each step of the above embodiment by a specific procedure of processing the interrupt via an SOC. The procedure is specifically as follows:

In step 901, a CPU 103 reads an interrupt flag register in a module in a non-interrupt program section.

In step 902, whether a first state type in the interrupt flag register in the module is a set state type or not is determined, and when the first state type is a set state, step 9021 is executed, while when the first state type is an unset state, step 9022 is executed.

In step 9021, after waiting for T time, step 901 is returned to. This step enables the query step to be repeatedly executed according to predetermined time, so that the fault of chip interrupt can be periodically detected.

In step 9022, a second state type of the corresponding interrupt flag in the module is queried, and when the second state type is the enabled state, step 902211 is executed, while when the second state type is the non-enabled state, step 90222 is executed.

In step 902211, priority of a non-interrupt program is increased. In order to avoid break of the non-interrupt program in the process of processing the interrupt, the priority of the non-interrupt program is increased.

In step 902212, the non-interrupt program calls a processing function corresponding to an interrupt.

In step 902213, the priority of the non-interrupt program is restored.

After processing, the non-interrupt program is restored to the original priority thereof, so as to avoid influencing other programs with higher priorities than that of the non-interrupt program.

In step 90222, an error is reported for an interrupt fault.

In step 902, when the first state type is a set state type, it indicates that the interrupt has occurred at present, and the CPU has not received the interrupt signal. At this time, the two situations are contradictory, indicating that the chip interrupt fails. In step 9022, when the second state type is the non-enabled state, the first state type should not be expressed as the set state, and at this time, the two situations are contradictory, so it can also indicate that the current chip interrupt has failed.

Figure 17:
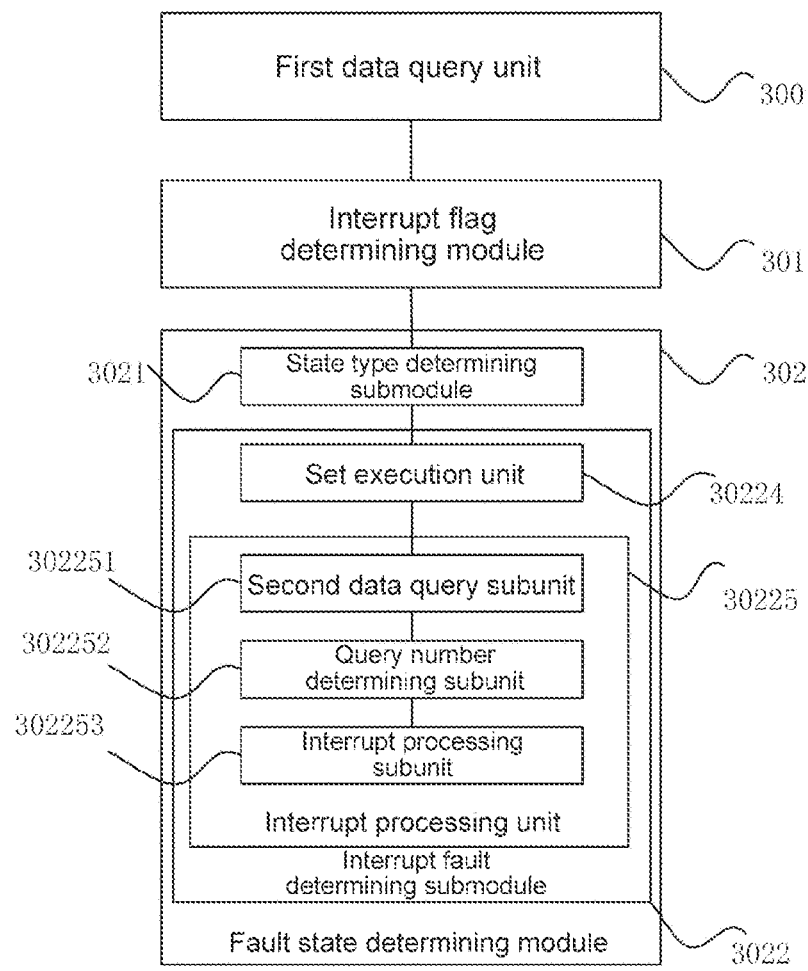
FIG. 17 is a schematic diagram of a chip fault diagnosis device provided by still another exemplary embodiment of the present disclosure.

As shown in FIG. 17, based on the above embodiment shown in FIG. 16, the interrupt processing unit 30225 includes:

A second data query subunit 302251, which is configured to query second data identifying query times of the second state type in an interrupt fault counter if the second state type indicates the enabled state type;

In some embodiments, because the interrupt processing involves access of multiple pieces of software to the chip interrupt, the interrupt fault counter is used to record the number of times for the enabled state of the interrupt to be continuously accessed. When the number of times that the non-interrupt program continuously detects the enabled state of the first state type does not exceed a specified number of times, it indicates that the current interrupt program is currently operating on a busy core. The current chip interrupt needs to wait for the interrupt program until the interrupt program correctly process the chip interrupt. In order to record the number of times for the enabled state of the current chip interrupt to be continuously accessed, the interrupt fault counter is used to record the number of times that multiple cores query about the enabled state type of the interrupt. The second data is a value stored in the interrupt fault counter, and the value stored in the interrupt fault counter will be increased by 1 every time the enabled state type is queried.

A query number determining subunit 302252, which is configured to determine the number of times for the enabled state type to be continuously queried based on the second data;

In some embodiments, after each interrupt is processed, the interrupt fault counter is reset, so the value in the interrupt fault counter is the number of times for the enabled state type of the current interrupt to be continuously queried.

An interrupt processing subunit 302253, which is configured to determine the fault state of the chip interrupt corresponding to the interrupt flag based on a comparison result between the number of times of being continuously queried and a predetermined threshold, and to process the interrupt by the non-interrupt program according to a predetermined processing mode.

In some embodiments, the predetermined threshold is set according to information such as an emergency state of the interrupt or the module in which the interrupt occurs. For example, the predetermined threshold may be set to 2. The more urgent the emergency state of the interrupt is, the smaller the threshold should be set. The more important the module in which the interrupt occurs will be, the smaller the predetermined threshold should be set.

As a preferred embodiment, FIG. 11 shows a specific flow chart of processing an interrupt by a multi-core SOC. The specific steps are as follows:

In step 1101, a CPU reads an interrupt flag register in a module in a non-interrupt program.

In step 1102, whether a first state type in the interrupt flag register in the module is a set state type or not is determined, and when the first state type is the set state type, step 9021 is executed, while when the first state type is an unset state type, step 11022 is executed.

In step 11021, after waiting for T time, step 1101 is returned to. This step enables the query step to be repeatedly executed according to predetermined time, so that the fault of chip interrupt can be periodically detected.

In step 11022, a second state type of the corresponding interrupt flag in the module is queried, and when the second state type is an enabled state, step 110222 is executed, while when the second state type is a non-enabled state, step 110221 is executed.

In step 110222, an interrupt fault counter increases 1.

In step 1102221, it is judged whether a count of the interrupt fault counter is larger than a predetermined threshold, and when the count is larger than the predetermined threshold, step 1102222 is executed, while when the count is not larger than the predetermined threshold, the current interrupt processing flow is ended. The difference between FIG. 11 and FIG. 9 is that, in FIG. 11, after confirming that the second state type is the enabled state, the processing emergency state is determined by querying the interrupt fault counter. When the number of times of being continuously queried exceeds the predetermined threshold, it indicates that the current interrupt needs to be processed as soon as possible. Therefore, the interrupt should be processed before confirmation of the failed state of the interrupt. When the number of times of being continuously queried does not exceed the predetermined threshold, it indicates that the current interrupt does not need to be processed as soon as possible, so the failed state of the interrupt is directly confirmed.

In step 1102222, priority of the non-interrupt program is increased. In order to avoid break of the non-interrupt program in the procedure of processing the interrupt, the priority of the non-interrupt program is increased.

In step 1102223, the non-interrupt program calls a processing function corresponding to the interrupt.

In step 1102224, the priority of the non-interrupt program is restored. After processing, the non-interrupt program is restored to the original priority thereof, so as to avoid influencing other programs with higher priorities than that of the non-interrupt program.

In step 110221, an error is reported for the interrupt fault.

In step 1102, when the first state type is the set state type, it indicates that the interrupt has occurred at present, and the CPU has not received the interrupt signal. At this time, the two situations are contradictory, indicating that the chip interrupt fails. In step 11022, when the second state type is the non-enabled state, the first state type should not be expressed as the set state, at this time, the two situations are contradictory, so it can also indicate that the current chip interrupt has failed.

Exemplary Electronic Equipment

Figure 18:
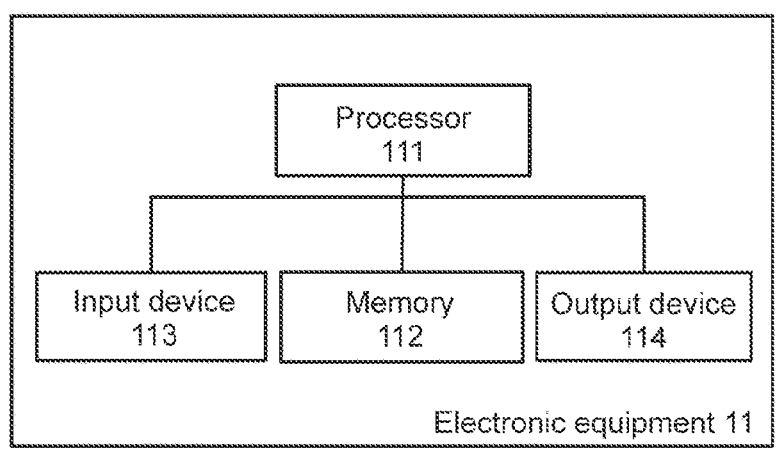
FIG. 18 is a structural diagram of electronic equipment provided by an exemplary embodiment of the present disclosure.

Electronic equipment according to an embodiment of the present disclosure will be described below with reference to FIG. 18. FIG. 18 shows a block diagram of electronic equipment according to an embodiment of the present disclosure.

As shown in FIG. 18, the electronic equipment 11 includes one or more processors 111 and a memory 112.

The processor 111 may be a central processing unit (CPU) or other forms of processing unit with a data processing capability and/or instruction execution capability, and may control other components in the electronic equipment 11 to perform desired functions.

The memory 112 may include one or more computer program products, which may include various forms of computer-readable storage media, such as a volatile memory and/or nonvolatile memory. The volatile memory may include, for example, a random access memory (RAM) and/or a cache, etc. The nonvolatile memory may include, for example, a read-only memory (ROM), a hard disk, a flash memory, and the like. On the computer-readable storage medium, one or more computer program instructions can be stored, and the processor 111 can execute the program instruction(s) to implement the chip fault diagnosis method of each of the embodiments of the present disclosure described above and/or other desired functions. In the computer-readable storage medium, various contents such as input signals, signal components, noise components and the like can also be stored.

In an example, the electronic equipment 11 may further include an input device 113 and an output device 114. These components are interconnected by a bus system and/or other forms of connection mechanism (not shown).

For example, the input device 113 may be, for example, a keyboard, a mouse and the like. When the electronic equipment is a stand-alone device, the input device 113 may be a communication network connector.

The output device 114 can output all kinds of information to the outside, and the output device 114 may include, for example, a display, a speaker, a printer, and a communication network and remote output devices connected thereto.

Of course, for simplicity, only some of the components related to the present disclosure in the electronic equipment 11 are shown in FIG. 18, and components such as a bus, an input/output interface, and the like are omitted. In addition, the electronic equipment 11 may also include any other suitable components according to the specific application situation.

Exemplary Computer Program Product and Computer-Readable Storage Media

In addition to the above methods, devices and equipment, embodiments of the present disclosure may also be computer program products that include computer program instructions that, when executed by a processor, cause the processor to perform the steps in the chip fault diagnosis method according to various embodiments of the present disclosure described in the above "exemplary methods" section of this specification.

The computer program product can write program codes for executing the operations of the embodiments of the present disclosure in the form of one programming language or any combination of more than two programming languages, including object-oriented programming languages such as Java, C++, etc., and conventional procedural programming languages such as "C" language or similar programming languages. The program codes can be executed completely on user computing equipment; partially on user equipment; as an independent software package; partially on the user computing equipment and partially on remote computing equipment, or completely on the remote computing device or a server.

In addition, embodiments of the present disclosure may also be computer-readable storage media on which computer program instructions are stored and when executed by a processor, cause the processor to execute the steps in the chip fault diagnosis method according to various embodiments of the present disclosure described in the above "exemplary methods" section of this specification.

The computer-readable storage medium may adopt one computer-readable medium or any combination of more readable media. The computer-readable medium may be a computer-readable signal medium or a computer-readable storage medium. The computer-readable storage medium may include, but is not limited to, electronic, magnetic, optical, electromagnetic, infrared, or semiconductor systems, devices, or apparatuses, or any combination thereof. More specific examples (non-exhaustive list) of computer-readable storage media include: electrical connection with one or more wires, portable disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

The basic principles of the present disclosure have been described with reference to specific embodiments above. But it should be pointed out that the advantages, strengths and effects mentioned in the present disclosure are only examples and not limitations, and these advantages, strengths and effects cannot be deemed to be necessary for each embodiment of the present disclosure. In addition, the specific details disclosed above are only for the purpose of illustration and convenience of understanding, but not for limitation. The above details do not limit that the present disclosure must be implemented with the above specific details.

The block diagrams of apparatuses, devices, equipment and systems involved in the present disclosure are only taken as illustrative examples and are not intended to require or imply that they must be connected, arranged and configured in the manner shown in the block diagram. It will be recognized by those skilled in the art that, these apparatuses, devices, equipment and systems can be connected, arranged and configured in any manner. Words such as "including", "include(s)", "having" and so on are open words, which mean "including but not limited to" and can be used interchangeably with each other. As used herein, the words "or" and "and" refer to the words "and/or" and can be used interchangeably with each other, unless the context clearly indicates otherwise. As used herein, the word "such as" or "for example" refers to the phrase "such as but not limited to" or "for example but not limited to" and can be used interchangeably with each other.

It should also be pointed out that in the device, equipment and method of the present disclosure, each component or step can be decomposed and/or recombined. These decompositions and/or re-combinations should be regarded as equivalents of the present disclosure.

The above description of the disclosed aspects is provided to enable any person skilled in the art to make or use the present disclosure. Various modifications to these aspects are quite apparent to those skilled in the art, and the general principles defined herein can be applied to other aspects without departing from the scope of the present disclosure. Therefore, the present disclosure is not intended to be limited to the aspects shown herein, but is to be accorded with the widest scope consistent with the principles and novel features disclosed herein.

The above description has been given for purposes of illustration and description. Furthermore, this description is not intended to limit the embodiments of the present disclosure to the forms disclosed herein. Although several exemplary aspects and embodiments have been discussed above, those skilled in the art will recognize certain variations, modifications, changes, additions and sub-combinations thereof.

The invention claimed is:

1. A chip fault diagnosis method, including:
   determining an interrupt flag of an interrupt flag register based on first data identifying an interrupt state in the interrupt flag register; and
   determining a fault state of a chip interrupt corresponding to the interrupt flag based on the interrupt flag,
   wherein the determining a fault state of a chip interrupt corresponding to the interrupt flag based on the interrupt flag includes:
      determining a state type of the interrupt flag, wherein the state type of the interrupt flag includes a first state type identifying an interrupt occurrence state and a second state type identifying an interrupt enabling state; and
      if the first state type indicates a set state type, querying the second state type;
      if the second state type indicates an enabled state type, determining the fault state of the chip interrupt corresponding to the interrupt flag to be that the interrupt has not failed; and if the second state type indicates a disenabled state type, determining the fault state of the chip interrupt corresponding to the interrupt flag to be that the interrupt has failed.

2. The method according to claim 1,
wherein the determining the fault state of the chip interrupt corresponding to the interrupt flag based on the state type of the interrupt flag further includes:
if the first state type indicates an unset state type, determining the fault state of the chip interrupt corresponding to the interrupt flag to be that the interrupt has failed.

3. The method according to claim 2, wherein before the determining an interrupt flag of an interrupt flag register based on first data identifying an interrupt state in the interrupt flag register, the method includes: querying the first data identifying the interrupt state in the interrupt flag register based on a predetermined time interval;
the determining the fault state of the chip interrupt corresponding to the interrupt flag based on the first state type includes:
if the first state type indicates a set state type, querying the second state type; and
determining the fault state of the chip interrupt corresponding to the interrupt flag based on the second state type, and processing the interrupt by a non-interrupt program according to a predetermined processing mode.

4. The method according to claim 3, wherein the determining the fault state of the chip interrupt corresponding to the interrupt flag based on the second state type, and processing the interrupt by a non-interrupt program according to a predetermined processing mode includes:
querying second data identifying a number of times for querying the second state type in the interrupt fault counter if the second state type indicates an enabled state type;
determining a number of times that the enabled state type has been continuously queried based on the second data;
determining the fault state of the chip interrupt corresponding to the interrupt flag based on a comparison result between the number of times that the enabled state type has been continuously queried and a predetermined threshold, and processing the interrupt by the non-interrupt program according to the predetermined processing mode.

5. The method according to claim 1, wherein the first data refers to data set in a preset field in the interrupt flag register, which changes based on the chip interrupt; and
the interrupt flag is a flag corresponding to the first data, and indicates whether an interrupt has occurred at present.

6. A non-transitory computer-readable storage medium, which stores a computer program used for executing a chip fault diagnosis method including:
determining an interrupt flag of an interrupt flag register based on first data identifying an interrupt state in the interrupt flag register; and
determining a fault state of a chip interrupt corresponding to the interrupt flag based on the interrupt flag,
wherein the determining a fault state of a chip interrupt corresponding to the interrupt flag based on the interrupt flag includes:
determining a state type of the interrupt flag, wherein the state type of the interrupt flag includes a first state type identifying an interrupt occurrence state and a second state type identifying an interrupt enabling state; and
if the first state type indicates a set state type, querying the second state type;
if the second state type indicates an enabled state type, determining the fault state of the chip interrupt corresponding to the interrupt flag to be that the interrupt has not failed;
if the second state type indicates a disenabled state type, determining the fault state of the chip interrupt corresponding to the interrupt flag to be that the interrupt has failed.

7. The non-transitory computer-readable storage medium according to claim 6, wherein
the determining the fault state of the chip interrupt corresponding to the interrupt flag based on the state type of the interrupt flag further includes:
if the first state type indicates an unset state type, determining the fault state of the chip interrupt corresponding to the interrupt flag to be that the interrupt has failed.

8. The non-transitory computer-readable storage medium according to claim 7, wherein before the determining an interrupt flag of an interrupt flag register based on first data identifying an interrupt state in the interrupt flag register, the method includes: querying the first data identifying the interrupt state in the interrupt flag register based on a predetermined time interval;
the determining the fault state of the chip interrupt corresponding to the interrupt flag based on the first state type includes:
if the first state type indicates a set state type, querying the second state type; and
determining the fault state of the chip interrupt corresponding to the interrupt flag based on the second state type, and processing the interrupt by a non-interrupt program according to a predetermined processing mode.

9. The non-transitory computer-readable storage medium according to claim 8, wherein the determining the fault state of the chip interrupt corresponding to the interrupt flag based on the second state type, and processing the interrupt by a non-interrupt program according to a predetermined processing mode includes:
querying second data identifying a number of times for querying the second state type in the interrupt fault counter if the second state type indicates an enabled state type;
determining a number of times that the enabled state type has been continuously queried based on the second data;
determining the fault state of the chip interrupt corresponding to the interrupt flag based on a comparison result between the number of times that the enabled state type has been continuously queried and a predetermined threshold, and processing the interrupt by the non-interrupt program according to the predetermined processing mode.

10. The non-transitory computer-readable storage medium according to claim 6, wherein the first data refers to data set in a preset field in the interrupt flag register, which changes based on the chip interrupt; and
the interrupt flag is a flag corresponding to the first data, and it indicates whether an interrupt has occurred at present.

11. Electronic equipment, including:
a processor; and
a memory for storing a processor-executable instruction,
wherein the processor is used for reading the executable instruction from the memory and executing a chip fault diagnosis method including:
  determining an interrupt flag of an interrupt flag register based on first data identifying an interrupt state in the interrupt flag register; and
  determining a fault state of a chip interrupt corresponding to the interrupt flag based on the interrupt flag,
wherein the determining a fault state of a chip interrupt corresponding to the interrupt flag based on the interrupt flag includes:
  determining a state type of the interrupt flag, wherein the state type of the interrupt flag includes a first state type identifying an interrupt occurrence state and a second state type identifying an interrupt enabling state; and
  if the first state type indicates a set state type, querying the second state type;
  if the second state type indicates an enabled state type, determining the fault state of the chip interrupt corresponding to the interrupt flag to be that the interrupt has not failed;
  if the second state type indicates a disenabled state type, determining the fault state of the chip interrupt corresponding to the interrupt flag to be that the interrupt has failed.

12. The electronic equipment according to claim 11, wherein
  the determining the fault state of the chip interrupt corresponding to the interrupt flag based on the state type of the interrupt flag further includes:
    if the first state type indicates an unset state type, determining the fault state of the chip interrupt corresponding to the interrupt flag to be that the interrupt has failed.

13. The electronic equipment according to claim 12, wherein before the determining an interrupt flag of an interrupt flag register based on first data identifying an interrupt state in the interrupt flag register, the method includes: querying the first data identifying the interrupt state in the interrupt flag register based on a predetermined time interval;
  the determining the fault state of the chip interrupt corresponding to the interrupt flag based on the first state type includes:
    if the first state type indicates a set state type, querying the second state type; and
    determining the fault state of the chip interrupt corresponding to the interrupt flag based on the second state type, and processing the interrupt by a non-interrupt program according to a predetermined processing mode.

14. The electronic equipment according to claim 13, wherein the determining the fault state of the chip interrupt corresponding to the interrupt flag based on the second state type, and processing the interrupt by a non-interrupt program according to a predetermined processing mode includes:
  querying second data identifying a number of times for querying the second state type in the interrupt fault counter if the second state type indicates an enabled state type;
  determining a number of times that the enabled state type has been continuously queried based on the second data;
  determining the fault state of the chip interrupt corresponding to the interrupt flag based on a comparison result between the number of times that the enabled state type has been continuously queried and a predetermined threshold, and processing the interrupt by the non-interrupt program according to the predetermined processing mode.

* * * * *